US012650803B2

(12) United States Patent (10) Patent No.: US 12,650,803 B2
Dai et al. (45) Date of Patent: Jun. 9, 2026

(54) WEARING DETECTION METHOD, WEARABLE DEVICE, AND STORAGE MEDIUM

(71) Applicant: HUAWEI TECHNOLOGIES CO., LTD., Guangdong (CN)

(72) Inventors: Na Dai, Dongguan (CN); Rongrong Wu, Dongguan (CN); Chengxia Ji, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 399 days.

(21) Appl. No.: 18/559,321

(22) PCT Filed: May 6, 2022

(86) PCT No.: PCT/CN2022/091059
§ 371 (c)(1),
(2) Date: Nov. 6, 2023

(87) PCT Pub. No.: WO2022/233308
PCT Pub. Date: Nov. 10, 2022

(65) Prior Publication Data
US 2024/0152313 A1 May 9, 2024

(30) Foreign Application Priority Data

May 7, 2021 (CN) .......................... 202110496911.8

(51) Int. Cl.
*G06F 3/16* (2006.01)
(52) U.S. Cl.
CPC .................................... *G06F 3/162* (2013.01)

(58) Field of Classification Search
CPC ...... H04R 1/1041; H04R 1/1016; H04R 3/00; H04R 1/1091
See application file for complete search history.

(56) References Cited

U.S. PATENT DOCUMENTS

| | | | | |
|---|---|---|---|---|
| 10,812,889 B2 * | 10/2020 | Sapozhnykov | ...... | H04R 1/1091 |
| 11,064,282 B1 * | 7/2021 | McElhone | ............ | H04R 5/033 |
| 2020/0374617 A1 | 11/2020 | Liu et al. | | |

FOREIGN PATENT DOCUMENTS

| | | |
|---|---|---|
| CN | 103581796 A | 2/2014 |
| CN | 108810693 A | 11/2018 |
| CN | 110291581 A | 9/2019 |
| CN | 110677768 A | 1/2020 |
| CN | 210225687 U | 3/2020 |
| CN | 111328009 A | 6/2020 |
| CN | 112013949 A | 12/2020 |

* cited by examiner

*Primary Examiner* — Omeed Alizada

(57) ABSTRACT

A wearing detection method, a wearable device, and a storage medium are provided. When the wearable device does not play audio and obtains a first audio signal captured by the microphone, the wearable device outputs a second audio signal by using the speaker, obtains a third audio signal captured by the microphone, obtains a signal feature of the third audio signal, and determines a wearing status of the wearable device based on the signal feature of the third audio signal. In this way, the wearing status of the wearable device can be determined by outputting the second audio signal and performing feature analysis on the corresponding input third audio signal, without a need of an additional sensor, thereby reducing sensor stacking.

18 Claims, 15 Drawing Sheets

Smartphone 201

Notebook computer 202

Wearable device 10

Tablet computer 203

Wireless headset 100

Wireless headset 100

Wireless headset 100

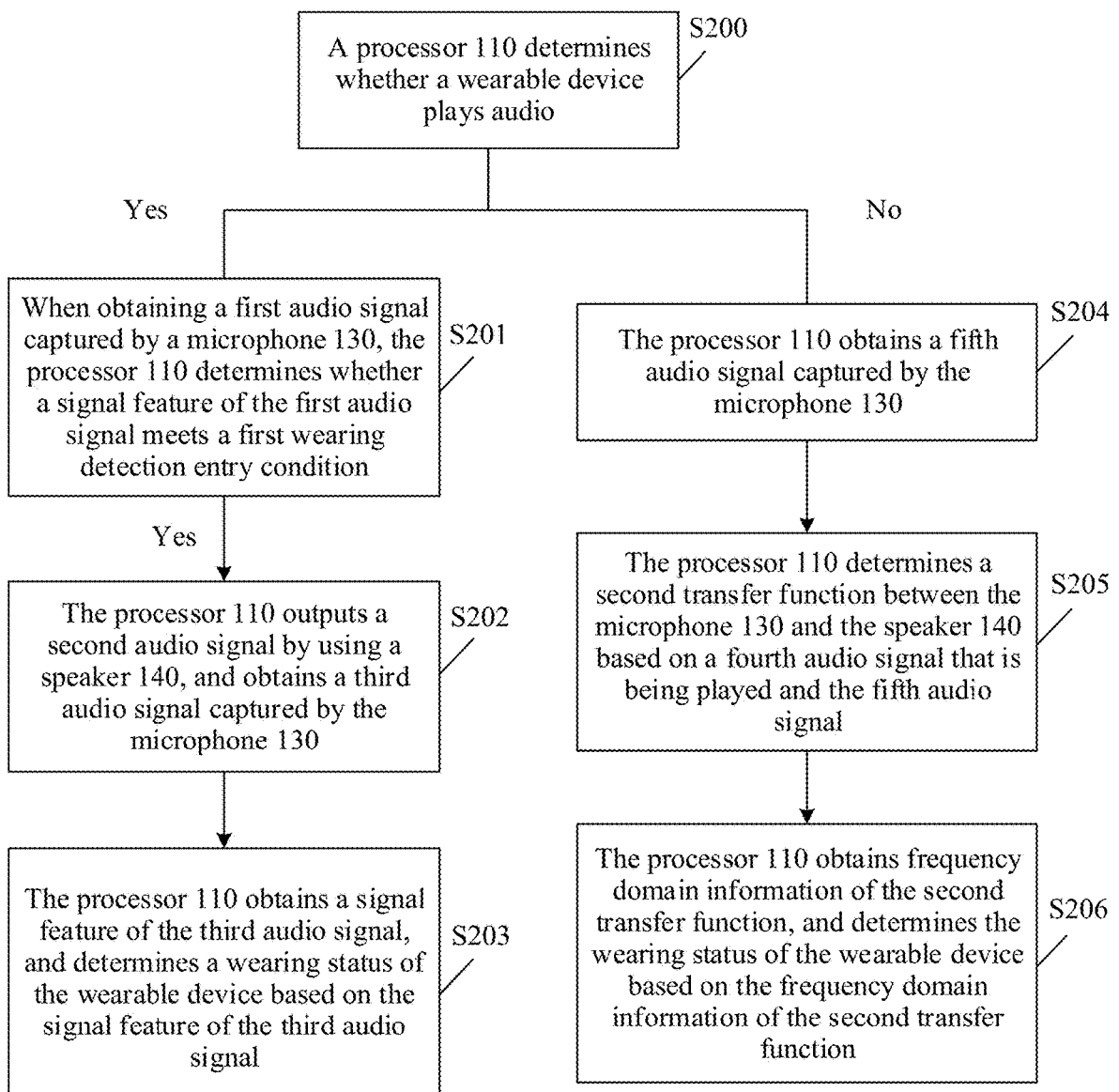

A processor 110 determines whether a wearable device plays audio — S200

Yes

No

When obtaining a first audio signal captured by a microphone 130, the processor 110 determines whether a signal feature of the first audio signal meets a first wearing detection entry condition — S201

Yes

The processor 110 outputs a second audio signal by using a speaker 140, and obtains a third audio signal captured by the microphone 130 — S202

The processor 110 obtains a signal feature of the third audio signal, and determines a wearing status of the wearable device based on the signal feature of the third audio signal — S203

The processor 110 obtains a fifth audio signal captured by the microphone 130 — S204

The processor 110 determines a second transfer function between the microphone 130 and the speaker 140 based on a fourth audio signal that is being played and the fifth audio signal — S205

The processor 110 obtains frequency domain information of the second transfer function, and determines the wearing status of the wearable device based on the frequency domain information of the second transfer function — S206

FIG. 8

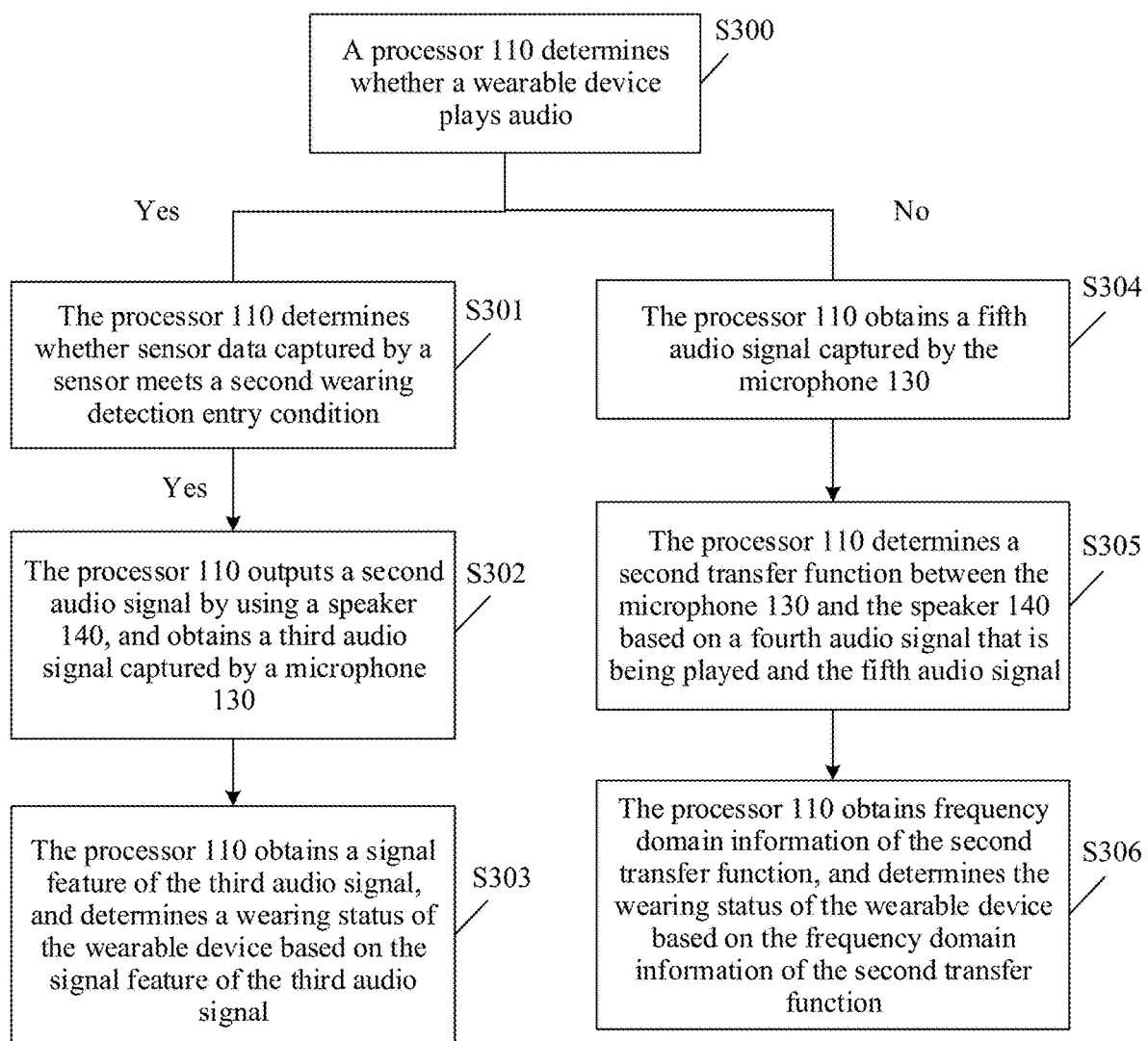

A processor 110 determines whether a wearable device plays audio                              S300

Yes                                                                                                         No

The processor 110 determines whether sensor data captured by a sensor meets a second wearing detection entry condition                              S301

The processor 110 obtains a fifth audio signal captured by the microphone 130                              S304

Yes

The processor 110 outputs a second audio signal by using a speaker 140, and obtains a third audio signal captured by a microphone 130                              S302

The processor 110 determines a second transfer function between the microphone 130 and the speaker 140 based on a fourth audio signal that is being played and the fifth audio signal                              S305

The processor 110 obtains a signal feature of the third audio signal, and determines a wearing status of the wearable device based on the signal feature of the third audio signal                              S303

The processor 110 obtains frequency domain information of the second transfer function, and determines the wearing status of the wearable device based on the frequency domain information of the second transfer function                              S306

FIG. 13

WEARING DETECTION METHOD, WEARABLE DEVICE, AND STORAGE MEDIUM

CROSS-REFERENCE TO RELATED APPLICATIONS

This application is a national stage of International Application No. PCT/CN2022/091059 filed on May 6, 2022, which claims priority to Chinese Patent Application No. 202110496911.8 filed on May 7, 2021. Both of the aforementioned applications are hereby incorporated by reference in their entireties.

TECHNICAL FIELD

This application relates to the field of terminal control, and in particular, to a wearing detection method and a related device.

BACKGROUND

As functions of terminal devices such as a mobile phone or a computer become increasingly perfect, people also have higher requirements for functions and experience of a peripheral wearable device connected to the terminal device. For example, when a user wears a headset for a plurality of times, there may be cases in which the user forgets to turn off the headset or forgets to stop audio playing. Therefore, the headset and the terminal device are always in an audio playing state. As a result, power consumption is fast, frequent charging is required, and user experience is poor. In addition, the user further needs to manually control the audio playing state. This is inconvenient.

To resolve the foregoing problems, a wearable device with a wearing detection function emerges. The wearing detection function may automatically identify a wearing status of the wearable device, so that the wearable device performs an operation that adapts to the wearing status. The headset is still used as an example. After it is determined that the headset is inserted into an ear, the headset enables functions of audio output and audio receiving. After it is determined that the headset is removed out of the ear, the headset disables the functions of audio output and audio receiving. In this way, power consumption of the headset and the terminal device can be reduced, power can be saved, and a sense of intelligent interaction between the user and the headset can be improved. Therefore, the wearing detection function has gradually become one of essential functions of the headset. In most existing wearing detection functions, a sensor (for example, an ultrasonic sensor or a proximity sensor) is disposed in the headset, and then whether the headset is inserted into the ear or removed out of the ear is determined directly based on sensor data of the sensor. However, in such a detection manner, insufficient detection precision occurs in many cases. For example, when the user performs touch adjustment or another control operation on the headset, the touch adjustment or the another control operation are easily misidentified, resulting in a further incorrect operation and poor user experience.

In view of this, how to improve precision of wearing detection and avoid misidentification has become an urgent problem to be resolved.

SUMMARY

Embodiments of this application provide a wearing detection method applied to a wearable device. Wearing detection is performed by using an audio signal output by a speaker and an audio signal received by a microphone in the wearable device, to determine a wearing status of the wearable device, thereby implementing more accurate wearing detection. This effectively reduces a misidentification rate of wearing detection, so that a further action (for example, audio playing) can be determined based on the wearing status, and user experience can be improved.

The following describes this application from a plurality of aspects. It is easy to understand that implementations of the plurality of aspects may be mutually referenced.

According to a first aspect, this application provides a wearing detection method, applied to a wearable device. The wearable device includes a microphone and a speaker. When the wearable device does not play audio and obtains a first audio signal captured by the microphone, the wearable device outputs a second audio signal by using the speaker, obtains a third audio signal captured by the microphone, obtains a signal feature of the third audio signal, and determines a wearing status of the wearable device based on the signal feature of the third audio signal. In other words, when a user performs a touch action on the wearable device, for example, wearing or taking off the wearable device, the microphone captures a sound (that is, the first audio signal), to trigger the wearable device to further output the preset second audio signal by using the speaker. The second audio signal herein may be an infrasound signal, or may be an audible domain signal. Because the speaker emits the sound, the microphone of the wearable device also correspondingly captures the third audio signal. Because signal features of audio signals captured by the microphone are different when the wearable device is in a wearing state and when the wearable device is in a non-wearing state, the wearing status of the wearable device may be determined based on the signal features of the third audio signal captured each time.

In the foregoing technical solution, an existing microphone 130 and a speaker 140 in the wearable device may be used to determine the wearing status of the wearable device by outputting the second audio signal and performing feature analysis on the correspondingly input third audio signal, without a need of an additional sensor. In other words, a dedicated sensor does not need to be additionally disposed in the wearable device for wearing detection. In this way, sensor stacking can be reduced, product costs can be reduced, and a product design can be smaller, lighter, and more flexible. In addition, the wearing detection is triggered only when the first audio signal is detected, so that continuous detection can be avoided, thereby reducing power consumption waste caused by continuous output of the second audio signal by the speaker and continuous signal processing and analysis by a processor.

In a possible implementation, when the wearable device does not play audio and obtains the first audio signal captured by the microphone, it may first be determined that a signal feature of the first audio signal meets a wearing detection entry condition. The wearing detection entry condition is set based on a regularity feature of an audio signal generated by touching the wearable device when the user wears the wearable device and takes the wearable device off.

In the foregoing technical solution, the first audio signal is matched with the wearing detection entry condition, to determine whether the first audio signal meets the feature when the user wears the wearable device or takes the wearable device off. Only when the wearing detection entry condition is met, it indicates that the wearable device may be in a process of being worn or taken off. In this case, the wearing status of the wearable device may change. In this case, the wearing detection method mentioned in the foregoing implementation is further performed to perform a second retest. In this way, a detection result may be more accurate. On the contrary, if the wearing detection entry condition is not met, it indicates that the wearable device may capture some noise only due to another case for example an accidental touch by the user, and the wearing status is not changed. In this case, a resource does not need to be mobilized to perform a step such as outputting the second audio signal, thereby reducing power consumption.

In a possible implementation, whether the signal feature of the first audio signal meets the wearing detection entry condition may be determined by first obtaining a spectrum feature of the first audio signal in a first frequency range, and then determining a first cross-correlation coefficient between the spectrum feature of the first audio signal in the first frequency range and a first spectrum feature. When the first cross-correlation coefficient reaches a first correlation threshold, it is determined that the signal feature of the first audio signal meets the wearing detection entry condition. The first frequency range may be preset based on a frequency band with an obvious feature and good differentiation in the audio signal generated when the wearable device is worn and taken off. The first spectrum feature is preset based on a consistency rule presented by a large quantity of audio signals generated when the wearable device is worn and taken off.

In the foregoing technical solution, the spectrum feature of the first audio signal in the first frequency range is matched with the preset first spectrum feature through analysis in a frequency domain dimension based on the feature of the audio signal generated when the wearable device is worn or taken off. In this case, it may be determined whether the signal feature of the first audio signal meets the wearing detection entry condition.

In a possible implementation, the first frequency range includes 20 Hz to 300 Hz or any sub-range within 20 Hz to 300 Hz. The first frequency range may alternatively be a range greater than 20 Hz to 300 Hz or a sub-range thereof.

In a possible implementation, whether the signal feature of the first audio signal meets the wearing detection entry condition may be determined by first extracting a temporal envelope of the first audio signal, and then determining a second cross-correlation coefficient between the temporal envelope of the first audio signal and a first temporal envelope. When the second cross-correlation coefficient reaches a second correlation threshold, it is determined that the signal feature of the first audio signal meets the wearing detection entry condition.

In the foregoing technical solution, the temporal envelope of the first audio signal is matched with the preset first temporal envelope through analysis in a time domain dimension based on the feature of the audio signal generated when the wearable device is worn or taken off. In this case, it may be determined whether the signal feature of the first audio signal meets the wearing detection entry condition.

In a possible implementation, the determining whether the signal feature of the first audio signal meets the wearing detection entry condition may be analyzed in both the time domain dimension and the frequency domain dimension. If a result obtained from either dimension meets the condition, it is determined that the signal feature of the first audio signal meets the wearing detection entry condition.

In a possible implementation, before the second audio signal is output by using the speaker and the third audio signal captured by the microphone is obtained, or before the second audio signal is output by using the speaker and the third audio signal captured by using the microphone is obtained, it may also be first determined that a signal amplitude of the first audio signal reaches a first signal amplitude threshold.

In the foregoing technical solution, the signal amplitude of the first audio signal is determined before the wearing detection is performed, so that wearing detection started due to a weak sound caused by shaking or slight adjustment of the user can be avoided, thereby further improving wearing detection efficiency and reducing power consumption.

In a possible implementation, it may be specifically determined, in the following manners, that the signal amplitude of the first audio signal reaches the first signal amplitude threshold: determining that a valid value of the first audio signal reaches a first amplitude threshold; determining that an average amplitude of the first audio signal reaches a second amplitude threshold; or determining that a maximum amplitude of the first audio signal reaches a third amplitude threshold.

In a possible implementation, after the third audio signal is obtained, frequency domain transformation may be performed on the third audio signal to obtain a frequency domain feature of the third audio signal in a second frequency range. Then, the wearing status of the wearable device may be determined based on the frequency domain feature of the third audio signal in the second frequency range. The second frequency range is preset based on whether the second audio signal is the infrasound signal or the audible domain signal, and is a frequency range that can represent an obvious feature of the audio signal captured in the wearing state and the non-wearing state. The first frequency domain feature is preset based on a rule presented by a large quantity of audio signals captured in the wearing state and the non-wearing state.

In a possible implementation, the first frequency domain feature includes a third signal amplitude threshold, and the wearing status of the wearable device may be determined based on a comparison between a maximum amplitude of a frequency response of the third audio signal in the second frequency range and the third signal amplitude threshold.

In a possible implementation, the first frequency domain feature includes a first frequency response, and a third cross-correlation coefficient between the frequency response of the third audio signal in the second frequency range and the first frequency response may be determined. The wearing status of the wearable device may be determined based on a comparison between the third cross-correlation coefficient and the third correlation threshold.

In a possible implementation, the second audio signal is an infrasound signal whose frequency range is less than 20 Hz, and the second frequency range includes 0 Hz to 20 Hz or any sub-range within 0 Hz to 20 Hz. Alternatively, the second audio signal is an audible domain signal whose frequency range is 20 Hz to 20000 Hz, and the second frequency range includes 20 Hz to 300 Hz or any sub-range within 20 Hz to 300 Hz.

In the foregoing technical solution, the second audio signal may be the infrasound signal, or may be the audible domain signal. The infrasound signal allows the user to perform wearing detection without sensing, and the audible domain signal improves the users' intelligent interaction.

In a possible implementation, when it is determined that the wearable device is playing audio, a fifth audio signal captured by the microphone is obtained, a transfer function between the microphone and the speaker is determined based on a fourth audio signal that is being played and the fifth audio signal, a signal feature of the transfer function is obtained, and the wearing status of the wearable device is determined based on the signal feature of the transfer function. Because the fourth audio signal is a random unknown signal, the transfer function needs to be determined based on the fourth audio signal and the fifth audio signal. Because the signal feature of the transfer function of the wearable device in the wearing state is different from that of the wearable device in the non-wearing state, the wearing status of the wearable device may be determined based on the signal feature of the transfer function captured each time.

In the foregoing technical solution, when audio is played, the transfer function is calculated directly by using the audio that is being played, without a need of a sensor, and a design is more flexible. The second audio signal does not need to be output, thereby reducing unnecessary power consumption.

In a possible implementation, after the transfer function is obtained, frequency domain transformation is performed on the transfer function to obtain a frequency domain feature of the transfer function in a third frequency range, and the wearing status of the wearable device is determined based on the frequency domain feature of the transfer function in the third frequency range and a second frequency domain feature. The third frequency range is preset based on whether the second audio signal is the infrasound signal or the audible domain signal, and is a frequency range that can represent an obvious feature of the transfer function obtained in the wearing state and the non-wearing state. The second frequency domain feature is preset based on a rule presented by a large quantity of transfer functions obtained in the wearing state and the non-wearing state.

In a possible implementation, the second frequency domain feature includes a transfer function amplitude threshold, and the wearing status of the wearable device may be determined based on a comparison between a maximum magnitude of a frequency response of the transfer function in the third frequency range and the transfer function amplitude threshold.

In a possible implementation, the second frequency domain feature includes a second frequency response, and a fourth cross-correlation coefficient between the frequency response of the transfer function in the third frequency range and the second frequency response may be determined. The wearing status of the wearable device is determined based on a comparison between the fourth cross-correlation coefficient and a fourth correlation threshold.

According to a second aspect, this application provides a wearing detection method, applied to a wearable device. The wearable device includes a microphone and a speaker. When the wearable device does not play audio and obtains a first audio signal captured by the microphone, the wearable device outputs a second audio signal by using the speaker, obtains a third audio signal captured by the microphone, determines a transfer function between the microphone and the speaker based on the second audio signal and the third audio signal, obtains a signal feature of the transfer function, and determines a wearing status of the wearable device based on the signal feature of the transfer function.

In the foregoing technical solution, an existing microphone 130 and a speaker 140 in the wearable device may be used to calculate the transfer function based on the output second audio signal and the input third audio signal and perform feature analysis on the transfer function, to determine the wearing status of the wearable device without a need of an additional sensor. In other words, a dedicated sensor does not need to be additionally disposed in the wearable device for wearing detection. In this way, sensor stacking can be reduced, product costs can be reduced, and a product design can be smaller, lighter, and more flexible. In addition, wearing detection is triggered only when the first audio signal is detected, and power consumption waste caused by continuous detection can be avoided.

According to a third aspect, this application provides a wearing detection method, applied to a wearable device. The wearable device includes a microphone, a speaker, and a sensor. When the wearable device does not play audio and determines that sensor data captured by the sensor meets a wearing detection entry condition, the wearable device outputs a first audio signal by using the speaker, obtains a second audio signal captured by the microphone, and then obtains a signal feature of the second audio signal, and determines a wearing status of the wearable device based on the signal feature of the second audio signal. The wearing detection entry condition is set based on a regularity feature of the sensor data captured by the sensor when a user wears the wearable device and when the user takes off the wearable device.

In the foregoing technical solution, when the user wears or takes off the wearable device, the sensor captures sensor data, and it may be determined whether the sensor data conforms to a feature when the user wears the wearable device or removes the wearable device by matching the sensor data with the wearing detection entry condition. Only when the wearing detection entry condition is met, it indicates that the wearable device may be in a process of being worn or taken off. In this case, the wearing status of the wearable device may change. In this case, the wearing status of the wearable device is further determined by outputting the first audio signal and performing feature analysis on the corresponding input second audio signal, to perform a second retest. In this way, a detection result may be more accurate. On the contrary, if the wearing detection entry condition is not met, it indicates that the wearable device may capture some sensor data only due to another action, and the wearing status is not changed. In this case, a resource does not need to be mobilized to perform a step such as outputting the second audio signal, thereby reducing power consumption.

In some possible implementations, the sensor includes a proximity sensor. If it is determined, based on sensor data captured by the proximity sensor, that an object approaches or moves away from the wearable device, it is determined that the sensor data captured by the sensor meets the wearing detection entry condition.

According to a fourth aspect, this application provides a wearing detection method, applied to a wearable device. The wearable device includes a microphone, a speaker, and a sensor. When the wearable device does not play audio and determines that sensor data captured by the sensor meets a wearing detection entry condition, the wearable device outputs a first audio signal by using the speaker, obtains a second audio signal captured by the microphone, determines a transfer function between the microphone and the speaker based on the first audio signal and the second audio signal, obtains a signal feature of the transfer function, and determines a wearing status of the wearable device based on the signal feature of the transfer function.

According to a fifth aspect, this application provides a wearable device, including a microphone, a speaker, a memory, and a processor. The microphone is configured to receive a sound signal and convert the sound signal into an audio signal. The speaker is configured to convert the audio signal into the sound signal for output. The memory is configured to store computer-readable instructions (or referred to as a computer program). When the computer-readable instructions are executed by the processor, the method provided in any implementation of the first aspect and the second aspect is implemented.

In some possible implementations, the microphone includes a feedback microphone.

According to a sixth aspect, this application provides a wearable device, including a microphone, a speaker, a sensor, a memory, and a processor. The microphone is configured to receive a sound signal and convert the sound signal into an audio signal. The speaker is configured to convert the audio signal into the sound signal for output. The sensor is configured to capture sensor data. The memory is configured to store computer-readable instructions (or referred to as a computer program). When the computer-readable instructions are executed by the processor, the method provided in any implementation of the third aspect and the fourth aspect is implemented.

In some possible implementations, the microphone includes a feedback microphone.

According to a seventh aspect, this application provides a computer storage medium. The computer storage medium may be non-volatile. The computer storage medium stores computer-readable instructions, and when the computer-readable instructions are executed by a processor, the method provided in any implementation of the first aspect to the fourth aspect is implemented.

According to an eighth aspect, this application provides a computer program product. The computer program product includes computer-readable instructions, and when the computer-readable instructions are executed by a processor, the method provided in any implementation of the first aspect to the fourth aspect is implemented.

BRIEF DESCRIPTION OF DRAWINGS

FIG. 8 is a schematic flowchart of another wearing detection method according to an embodiment of this application;

FIG. 13 is a schematic flowchart of another wearing detection method according to an embodiment of this application.

DESCRIPTION OF EMBODIMENTS

To facilitate understanding of technical solutions in embodiments of this application, an application scenario to which a related technology of this application is applicable is first described.

Figure 1:
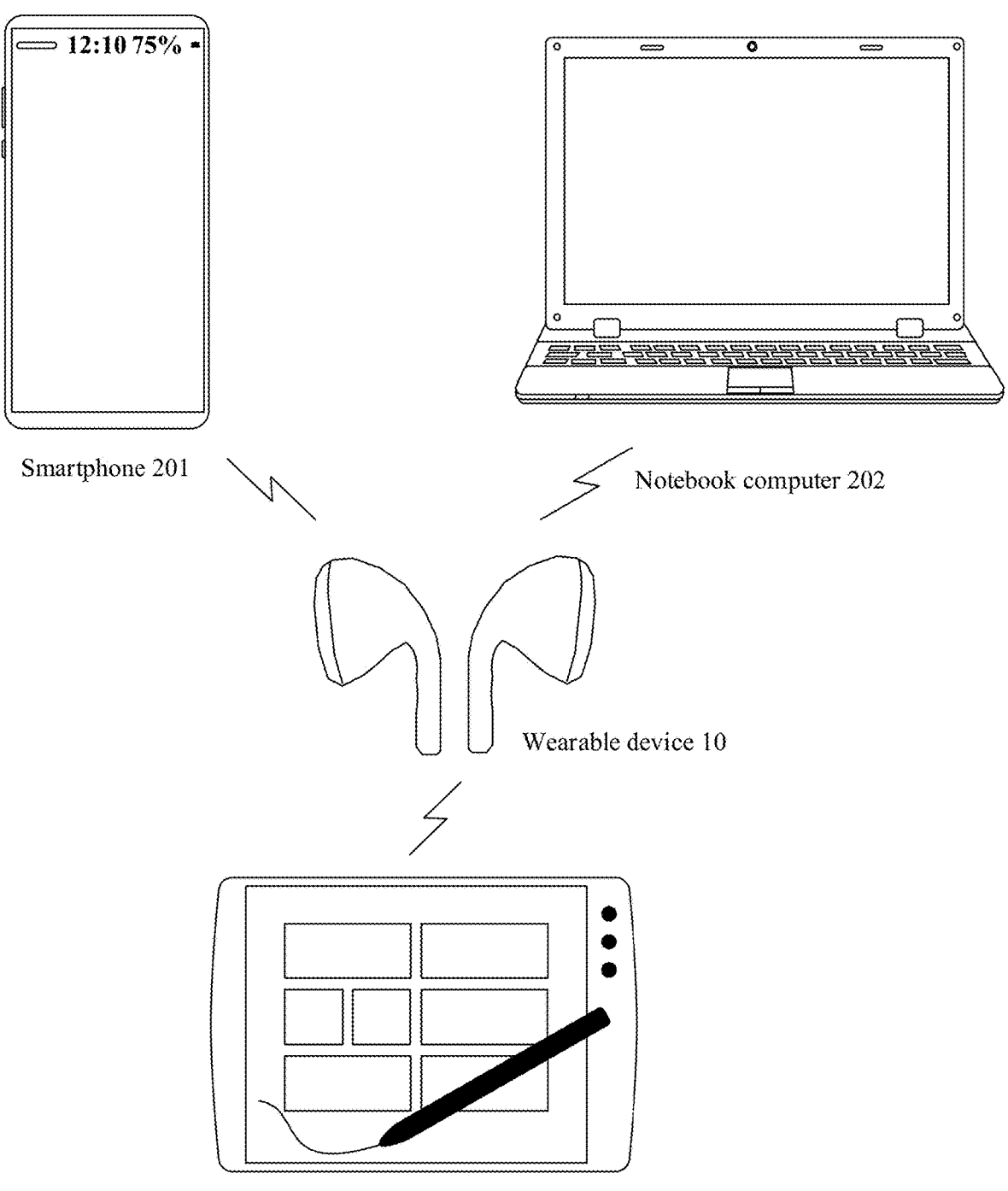
FIG. 1 is a schematic diagram of an application scenario of a wearing detection method according to an embodiment of this application.

Currently, in a process of using a terminal device for example a smartphone, a tablet computer, a smart television, a notebook computer, or a vehicle-mounted device, one or more wearable devices are usually configured to cooperate with the terminal device, to implement a more convenient operation and a more powerful function. As shown in FIG. 1, a wearable device 10 (a wireless headset is shown in the figure) and terminal devices 20 (a smartphone 201, a notebook computer 202, and a tablet computer 203 are shown in FIG. 1) may establish connections for communication. Specifically, a connection manner may be, for example, a wired connection or a wireless connection. For example, pairing between the wearable device and the terminal devices may be implemented through a Bluetooth connection, to implement communication between the wearable device and the terminal devices. In this way, the terminal devices may control the wearable device, and a wearing status of the wearable device may also affect some operation behaviors of the terminal devices. For example, the wearable device is the wireless headset, and the terminal devices may control the wireless headset to play audio and what audio to play. In addition, the wearing status of the wireless headset may also affect time of an operation of triggering audio play by the terminal device. Specifically, the audio play may be triggered when it is determined that the wireless headset is worn on a human ear.

The wearing status in this embodiment of this application may include two states: a wearing state and a non-wearing state. The wearing state may indicate that the wearable device is currently worn by a user, and the non-wearing state may indicate that the wearable device is currently removed from the user. Further, for wearable devices with different features and functions, the wearing state may alternatively indicate that the wearable device is currently worn on a specific part of the user, and the non-wearing state may indicate that the wearable device is currently removed from a specific part of the user. For example, when the wearable device is the headset, the wearing state indicates that the headset is in an in-ear state (also referred to as on-ear), and the non-wearing state indicates that the headset is in an out-of-ear state (also referred to as off-ear). The in-ear state may specifically mean that the headset is in a position where the headset needs to be when the headset is worn, for example, a position near an ear or a tympanic membrane of a human body. The out-of-ear state may specifically mean that the headset is not in the position where the headset needs to be when the headset is worn, for example, a position near an ear or a tympanic membrane of a human body, in other words, the headset is away from the position where the headset needs to be when the headset is worn. For another example, when the wearable device is a watch, the wearing state indicates that the watch is near a human wrist or an arm, and the non-wearing state indicates that the watch is away from a human wrist or an arm.

Based on the foregoing similar scenario, the wearing status of the wearable device needs to be detected, so that the wearable device and/or the terminal devices connected to the wearable device perform an operation that adapts to the wearing status. Therefore, embodiments of this application provide a wearing detection method applied to a wearable device, to more accurately identify a wearing status of the wearable device by using the method, so that a terminal device can better control the wearable device.

It should be understood that, the application scenario described in embodiments of this application is intended to describe the technical solutions in embodiments of this application more clearly, but constitute no limitation on the technical solutions provided in embodiments of this application. Persons of ordinary skill in the art may learn that the technical solutions provided in embodiments of this application are also applicable to a similar technical problem as a new application scenario emerges.

The wearable device in embodiments of this application may include glasses, sunglasses, a headset, a watch, a band, or the like. The wearable device includes a processor, a microphone, and a speaker that are configured to detect a wearing status of the wearable device, and a communication module configured to transmit an instruction or information to a connected terminal device. Wearing detection methods for all wearable devices are similar. Therefore, the following describes the wearing detection method of this application by using a headset as an example in embodiments of this application. The headset may be a wired headset or a wireless headset, or may be an over-ear headphone or an in-ear headset. In embodiments of this application, a wireless in-ear headset is mainly used as an example for description. However, it should be understood that the wearing detection solution provided in embodiments of this application may be applied to but is not limited to the various wearable devices mentioned above.

The following describes an example of a wearable device provided in an embodiment of this application.

Figure 2A:
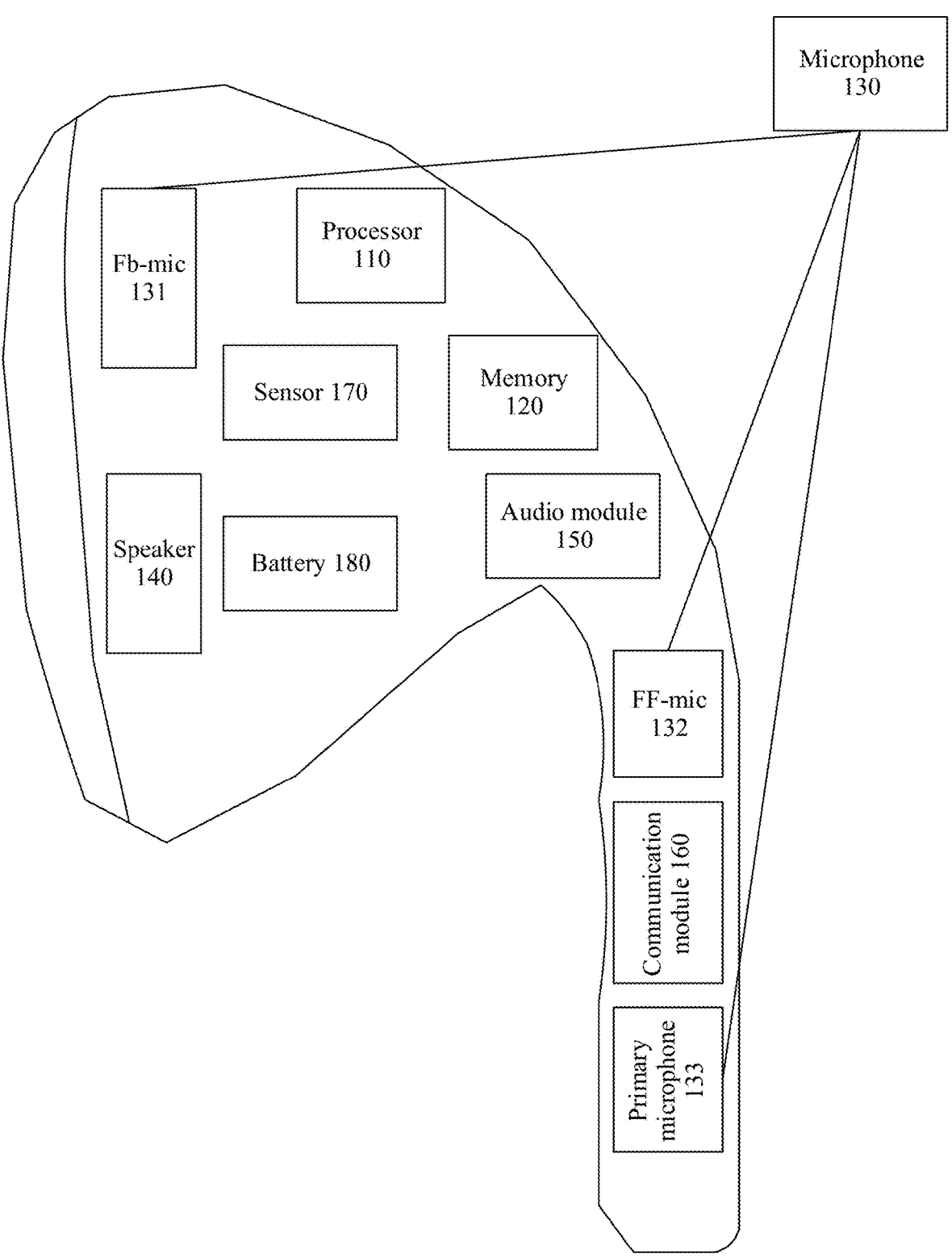
FIG. 2A is a schematic diagram of a structure of a wireless headset according to an embodiment of this application.
Figure 2B:
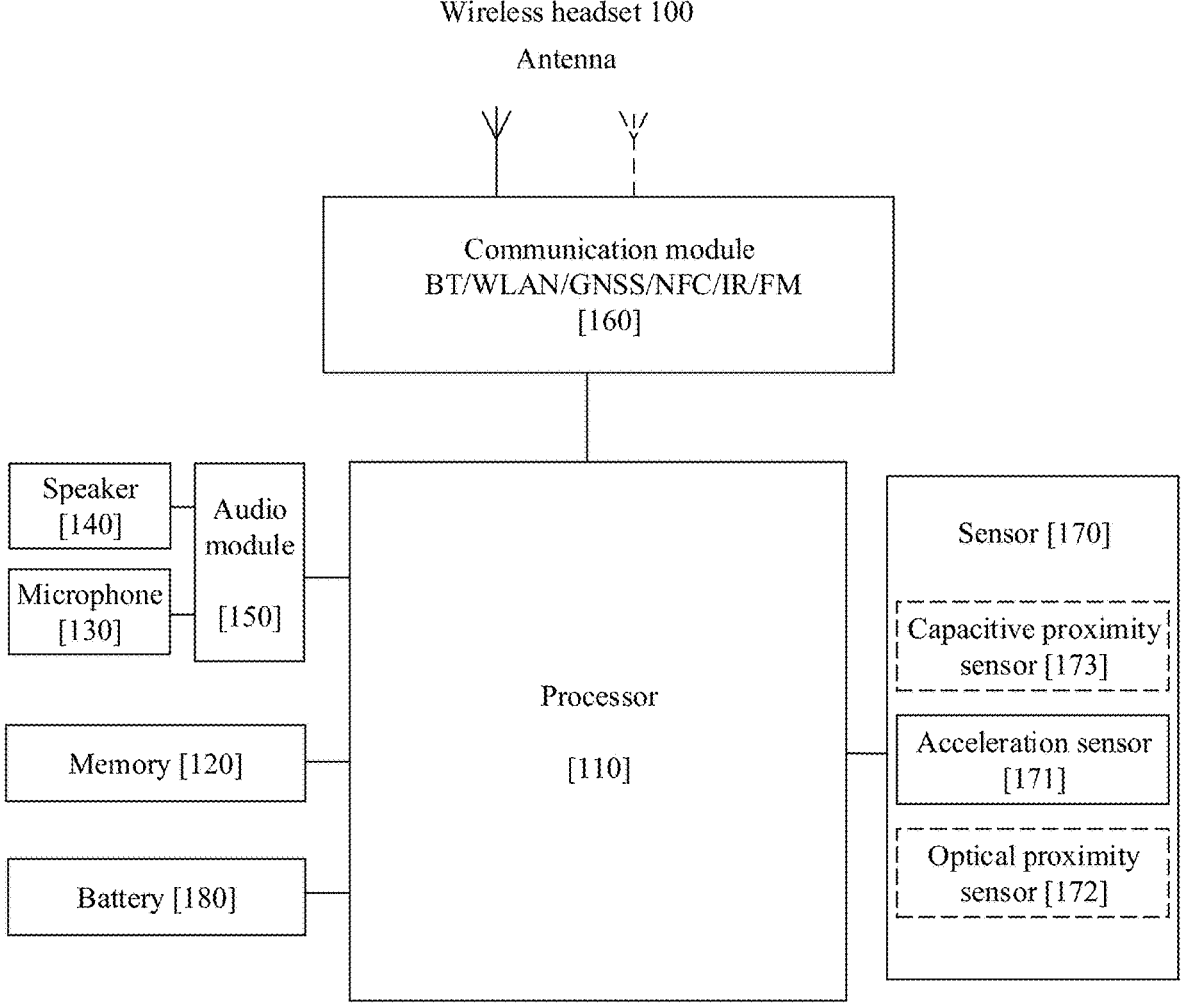
FIG. 2B is a schematic diagram of a structure of another wireless headset according to an embodiment of this application.

FIG. 2A and FIG. 2B are schematic diagrams of structures of a wireless headset according to an embodiment of this application. The wireless headset is collectively referred to as a wireless headset 100 below.

It should be understood that the wireless headset 100 may have more or fewer components than those shown in the figure, or two or more components may be combined, or different component configurations may be used. Various components shown in FIG. 1 may be implemented in hardware including one or more signal processing and/or application-specific integrated circuits, software, or a combination of hardware and software.

The wireless headset 100 may include a processor 110, a memory 120, a microphone 130, a speaker 140, an audio module 150, a communication module 160, a sensor 170, a battery 180, and the like.

The processor 110 may include one or more processing units. For example, the processor 110 may include a controller and a digital signal processor (digital signal processor, DSP), and the like. Different processing units may be independent components, or may be integrated into one or more processors. The controller may be a nerve center and a command center of the wireless headset 100. The controller may generate an operation control signal based on instruction operation code and a time sequence signal, to complete control of instruction reading and instruction execution. The DSP is configured to perform various digital signal processing on an audio digital signal.

The memory 120 may be configured to store computer-executable program code. The executable program code includes instructions. The processor 110 executes various function applications and data processing of the wireless headset 100 by running the instructions stored in the memory 120

The microphone 130, also referred to as a "mike" or a "mic", is configured to convert a sound signal into an audio signal (electrical signal). The microphone 130 may include a feedback microphone 131 (feedback microphone, Fb-mic), a feedforward microphone 132 (feedforwad microphone, FF-mic), and a call microphone 133. The feedback microphone 131 is configured to receive a noise signal in an ear, the feedforward microphone 132 is configured to receive a noise signal outside the ear, and the call microphone 133 is configured to receive a sound signal of a user during a call.

The speaker 140, also referred to as a "loudspeaker", is configured to convert an audio electrical signal into a sound signal.

The audio module 150 is connected to the microphone 130, the speaker 140, and the processor 110, and is configured to convert a digital audio signal processed by the processor 110 into an analog audio signal and output the analog audio signal to the speaker 140, and is also configured to convert an analog audio signal input by the microphone 130 into a digital audio signal and output the digital audio signal to the processor 110.

The communication module 160 is configured to provide a capability for the wireless headset 100 to communicate with an external device, and may include a radio frequency transceiver circuit, an antenna, and the like that support various wireless connection manners. Specifically, the communication module 160 may be a Bluetooth module, and may be configured to perform pairing with a terminal device.

The sensor 170 may include an acceleration sensor 171. Further, in some scenarios, the sensor 170 may further include an optical proximity sensor 172 or a capacitive proximity sensor 173, configured to detect whether a specific substance approaches.

The battery 180 is configured to connect to the processor 110, the memory 120, the microphone 130, the speaker 140, the audio module 150, the communication module 160, the sensor 170, and the like, and supply power to the foregoing components.

Figure 2C:
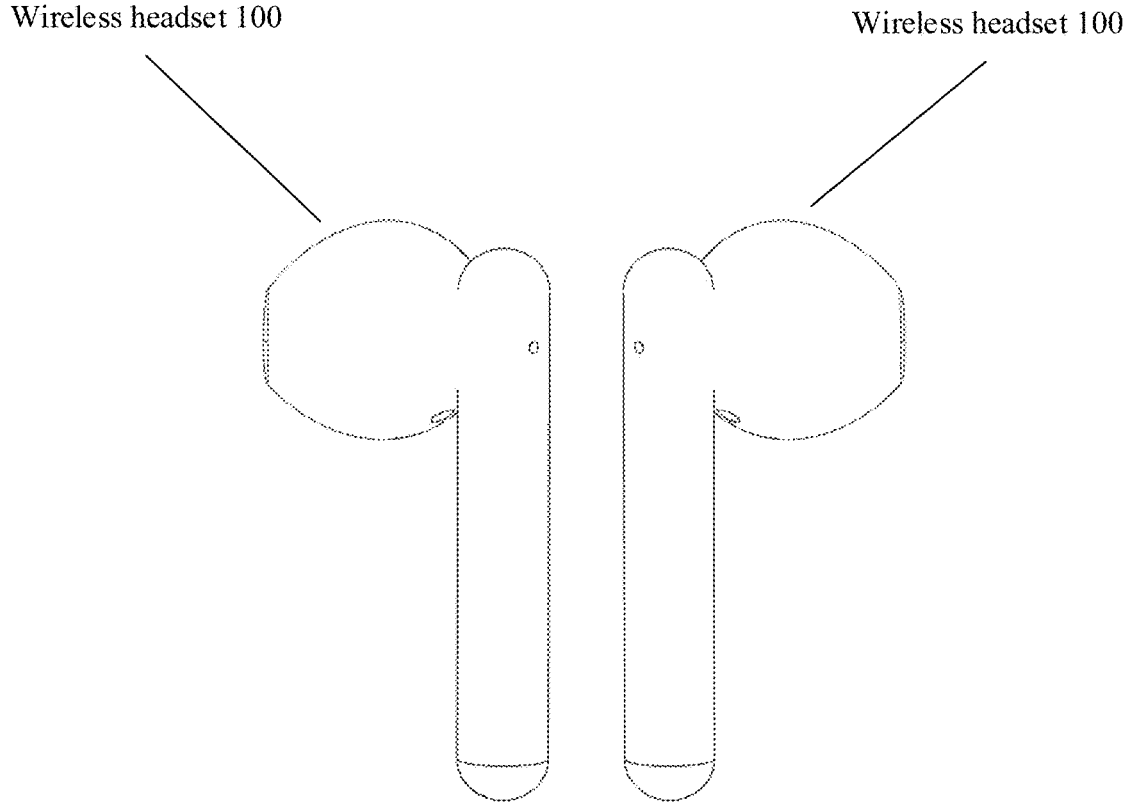
FIG. 2C is a schematic diagram of a pair of wireless headsets according to an embodiment of this application.

In some implementation scenarios, as shown in FIG. 2C, the wireless headset 100 may alternatively appear in pairs. The modules of the wireless headset 100 shown in FIG. 2A and FIG. 2B may be disposed on each of the two wireless headsets 100 and the two wireless headsets 100 may implement functions corresponding to the modules.

Based on the application scenario shown in FIG. 1 and the wireless headset 100 shown in FIG. 2A to FIG. 2C, the following describes in detail a wearing detection method provided in embodiments of this application. It should be noted that, in the implementation scenario of the paired wireless headsets 100 shown in FIG. 2C, the processor 110 may perform wearing detection on both wireless headsets 100, and specific detection manners are consistent. Therefore, in addition to a specific scenario, no particular distinction is made between single or paired wireless headsets 100.

Figure 3:
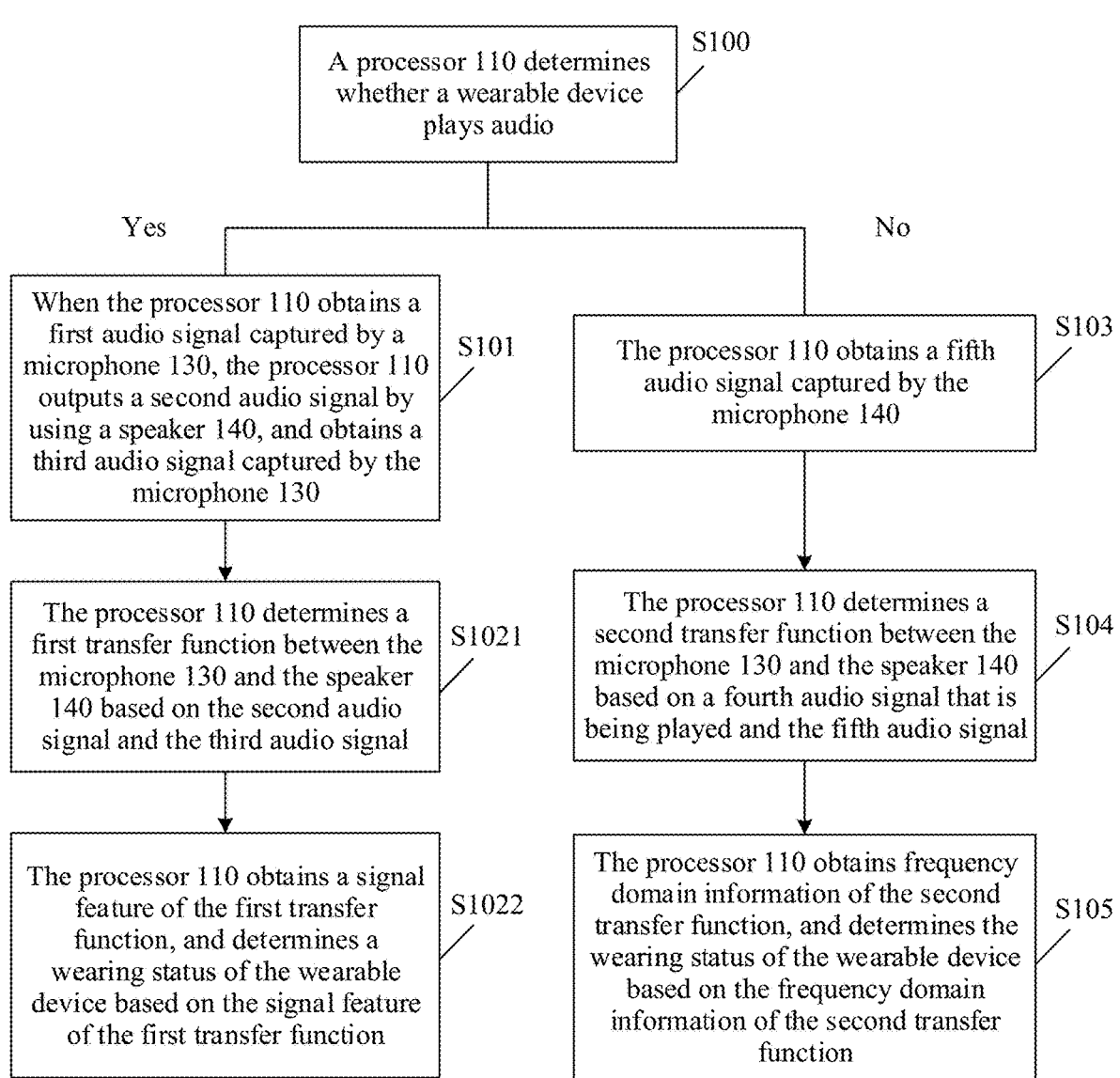
FIG. 3 is a schematic flowchart of a wearing detection method according to an embodiment of this application.
Figure 4:
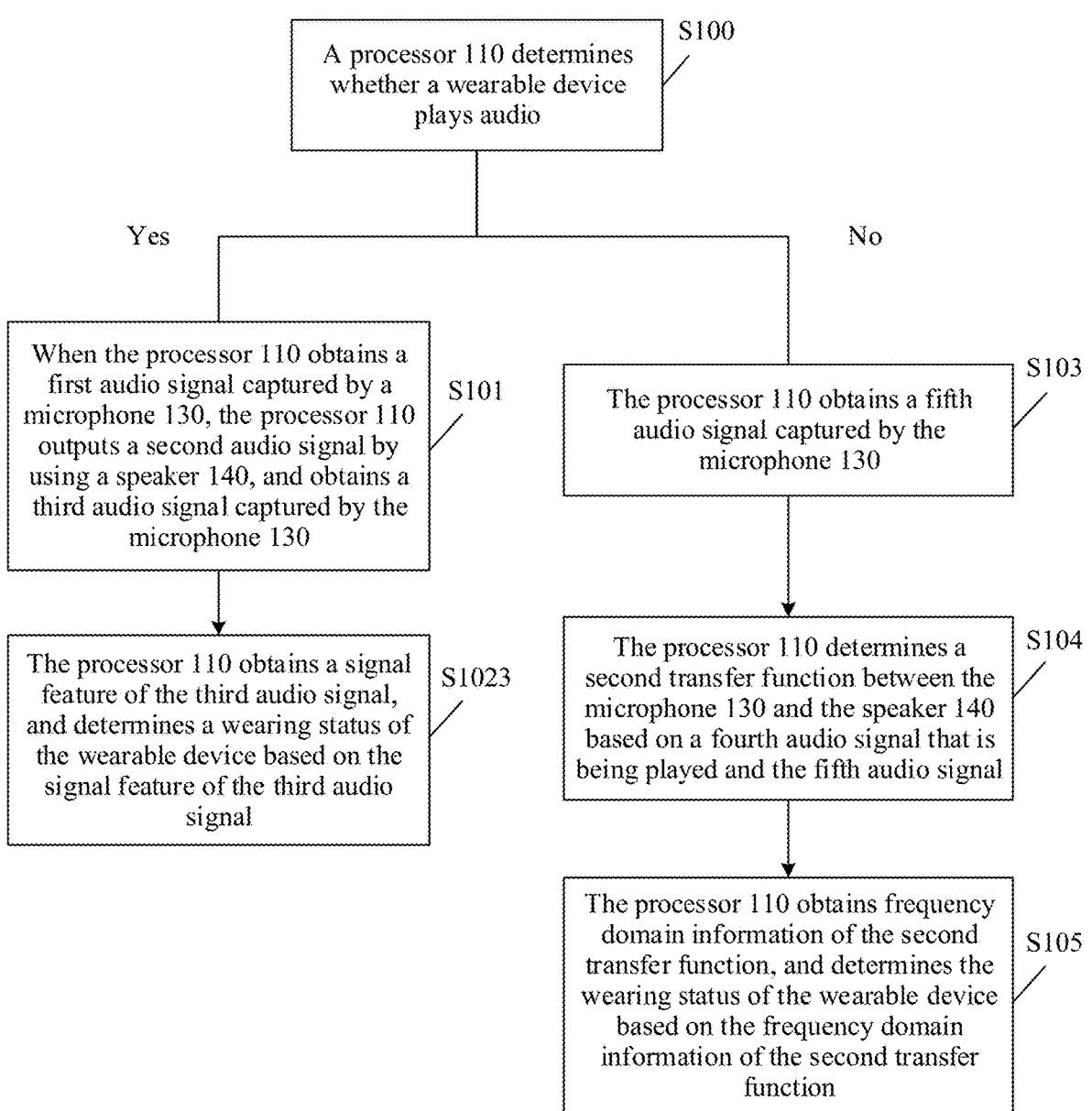
FIG. 4 is a schematic flowchart of another wearing detection method according to an embodiment of this application.

FIG. 3 and FIG. 4 are schematic flowcharts of two wearing detection methods according to embodiments of this application. In the embodiments shown in FIG. 3 and FIG. 4, a processor 110 determines, by using a microphone 130 and a speaker 140 that are already in a wireless headset 100, whether the headset is in an in-ear state or an out-of-ear state by analyzing features of input and output audio signals, without a need of an additional sensor. In other words, a dedicated sensor does not need to be additionally disposed in the wireless headset 100 for wearing detection. In this way, sensor stacking can be reduced, product costs can be reduced, and a product design can be smaller, lighter, and more flexible.

Most steps of the embodiments in FIG. 3 and FIG. 4 are similar. A main difference lies in that in the embodiment in FIG. 3, when the processor determines that the wearable device does not play audio, S101, S1021, and S1022 are performed. In the embodiment in FIG. 4, when the processor determines that the wearable device does not play audio, S101 and S1023 are performed. The following describes in detail the wearing detection methods shown in FIG. 3 and FIG. 4.

S100: The processor 110 determines whether the wearable device plays audio. If the wearable device is playing audio, S103 to S105 are performed. If no audio is played, S101, S1021, and S1022 are performed as shown in FIG. 3, or S101 and S1023 are performed as shown in FIG. 4.

In this embodiment of this application, the processor 110 may use two different processing manners for the wireless headset 100 in which audio is being played and no audio is played. Therefore, the processor 110 may first determine whether the wireless headset 100 plays audio, and determine a corresponding processing step based on a specific state. Because the processor 110 is a control center of the wireless headset 100, the processor 110 may directly determine various current states of the wireless headset 100, including whether to play audio, what audio to play, and the like. In addition, when the wireless headset 100 does not play audio, S101, S1022, and S1023 are performed, and when the wireless headset 100 is playing audio, S103 to S105 are performed.

S101: When the processor 110 obtains a first audio signal captured by the microphone 130, the processor 110 outputs a second audio signal by using the speaker 140, and obtains a third audio signal captured by the microphone 130.

For example, in the wireless headset 100 in FIG. 2A, the microphone 130 in this embodiment of this application may be a feedback microphone 131 (Fb-mic) that is near a human ear in an in-ear state. The following uses the Fb-mic 131 as an example for specific description.

Specifically, when a user wears the headset or removes the headset from the ear, a sound is generated instantaneously due to contact between the headset and the human ear. In this case, the Fb-mic 131 receives a sound signal generated due to the contact, converts the sound signal into the first audio signal, and sends the first audio signal to the processor 110. After obtaining the first audio signal, the processor 110 outputs the second audio signal by using the speaker 140, that is, drives the speaker 140 to convert the second audio signal into a sound signal for playing.

The second audio signal may be a segment of audio signal preset on the processor 110. After obtaining the first audio signal, the processor 110 invokes the second audio signal for playing. In a specific implementation process, the second audio signal may be set as an infrasound signal, that is, an audio signal whose frequency range is less than 20 Hz. A frequency of the infrasound signal is a range that cannot be sensed by the human ear. Therefore, when the infrasound signal is used, wearing detection can be performed without being sensed by the user. Certainly, the second audio signal may alternatively be set as an audible domain signal that can be sensed by the human ear, that is, an audio signal whose frequency range is 20 Hz to 20000 Hz. In this way, a sense of interaction between the user and the headset can be improved. Further, regardless of whether the second audio signal is the infrasound signal or the audible domain signal, the second audio signal may be a single-frequency signal (for example, 5 Hz or 100 Hz), or may be a signal in a frequency range (for example, 5 Hz to 10 Hz or 100 Hz to 1000 Hz). This may be set based on an actual situation. This is not specifically limited in this application.

When the processor 110 drives the speaker 140 to output the second audio signal, the Fb-mic 131 immediately captures the third audio signal due to generation of the sound signal. Simply speaking, the Fb-mic 131 captures the sound signal at a moment when the speaker 140 emits the sound signal. In addition, the Fb-mic 131 converts the sound signal into the third audio signal, and sends the third audio signal to the processor 110.

Figure 5:
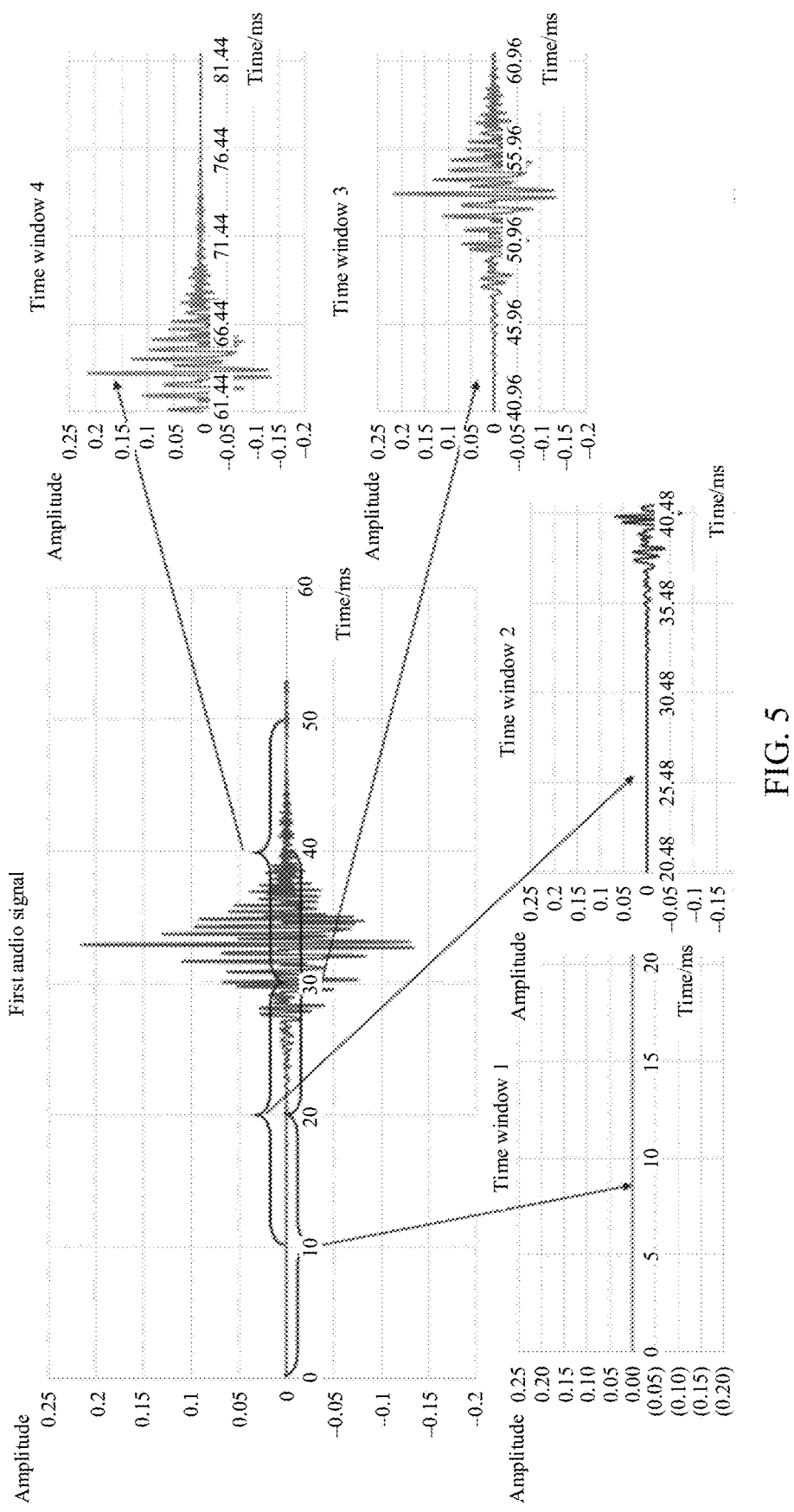
FIG. 5 is a schematic diagram of time window interception of an audio signal according to an embodiment of this application.

It should be noted that, as shown in FIG. 5, the first audio signal captured by the microphone 130 may be a segment of signal that includes a plurality of frames. In this embodiment of this application, the processor 110 may intercept the first audio signal by using a sliding time window, to obtain and process a frame of signal in each time window (FIG. 5 shows signals intercepted by using four time windows). The processing steps for any audio are the same. Therefore, detailed description and differentiation are not provided in this embodiment of this application. Alternatively, the second audio signal, the third audio signal, a fourth audio signal, and a fifth audio signal may be intercepted and processed by using the sliding time window. Details are not described in the following.

Further, it may be understood that, when the wireless headset 100 is in the in-ear state, a weak sound may be caused by shaking or slight adjustment of the user, and similarly, when the wireless headset 100 is in the out-of-ear state, a weak sound may also be caused by a slight touch. In this case, the microphone 130 may also receive the first audio signal, to trigger the processor 110 to output the second audio signal by using the speaker 140 and obtain the third audio signal captured by the microphone 130. However, based on features of the audio signal when the wireless headset 100 is inserted into and removed from the ear, such a weak audio signal is generally not generated.

Based on this, when obtaining the first audio signal, the processor 110 may first determine whether a signal amplitude of the first audio signal reaches a first signal amplitude threshold. If the signal amplitude of the first audio signal reaches the first signal amplitude threshold, a subsequent step is further performed; otherwise, the subsequent step is not performed. In this way, wearing detection efficiency can be further improved, and power consumption can be reduced.

Specifically, there may be many methods for determining whether the signal amplitude of the first audio signal meets the first signal amplitude threshold. For example, a valid value of the first audio signal, that is, a root mean square of the amplitude, may be obtained. If the valid value of the first audio signal reaches a preset first amplitude threshold, the subsequent step is performed; otherwise, the subsequent step is not performed. In addition, whether the first signal amplitude threshold is reached may be determined by using an average amplitude or a maximum amplitude of the first audio signal. This is not specifically limited in this embodiment of this application. In a specific implementation process, the signal amplitude may be measured by using a signal voltage.

Refer to FIG. 3. In a possible implementation, after S101, the processor 110 may perform S1021 and S1022. The following first describes this technical solution.

S1021: The processor 110 determines a first transfer function between the microphone 130 and the speaker 140 based on the second audio signal and the third audio signal.

A transfer function is a function used to represent a relationship between an input and an output of an object, and may be specifically a function obtained by using a ratio of the output to the input. In this embodiment of this application, the output is equivalent to the third audio signal (the audio signal captured by the Fb-mic 131), and the input is equivalent to the second audio signal (the audio signal output by the speaker 140). Therefore, a ratio of the third audio signal to the second audio signal may be used as the first transfer function. In specific implementation, the ratio of the third audio signal to the second audio signal may be directly calculated based on time domain signals of the third audio signal and the second audio signal, or some frequency domain transformation may be performed on the third audio signal and the second audio signal first before the ratio of the third audio signal to the second audio signal is calculated. For example, the first transfer function may be calculated based on a ratio of a Laplace transform of the third audio signal to a Laplace transform of the second audio signal, or the first transfer function may be calculated based on a ratio of a Fourier transform of the third audio signal to a Fourier transform of the second audio signal. Actually, the ratio of the second audio signal to the third audio signal may be used as the first transfer function. There are a plurality of manners of calculating the first transfer function. This is not limited in this application. Any function that can represent a relationship between the third audio signal and the second audio signal can be the first transfer function specified in this embodiment of this application.

S1022: The processor 110 obtains a signal feature of the first transfer function, and determines a wearing status of the wearable device based on the signal feature of the first transfer function.

It may be understood that the headset is in a closed space in the in-ear state, and is in an open space in the out-of-ear state. Therefore, when the speaker 140 outputs a same second audio signal, a third audio signal captured by the Fb-mic 131 when the wireless headset 100 is in the in-ear state is different from a third audio signal captured by the Fb-mic 131 when the wireless headset 100 is in the out-of-ear state. Therefore, a first transfer function of the wireless headset 100 in the in-ear state is also different from a first transfer function of the wireless headset 100 in the out-of-ear state. In the embodiment shown in FIG. 3 of this application, the wearing status of the wearable device is determined by analyzing the feature of the first transfer function obtained in S1021.

In this embodiment of this application, the signal feature may include various parameters, functions, graphs, or the like that represent the signal feature, and specifically include various time domain features and frequency domain features that are obtained through time domain analysis and frequency domain analysis. Specifically, the processor 110 may extract a frequency domain feature of the first transfer function. The frequency domain feature herein may include characteristic curves obtained by performing frequency domain transformation on a frequency response, an energy spectrum, a power spectrum, and the like, and may alternatively include features such as an amplitude, an energy value, and a power value further extracted from these characteristic curves.

The processor 110 compares the extracted frequency domain feature with a frequency domain feature preset on the processor 110, to determine whether the wireless headset 100 is in the in-ear state or the out-of-ear state. The frequency domain feature preset on the processor 110 is set based on features of frequency domain features of the wireless headset 100 in the in-ear state and the out-of-ear state. Therefore, after the frequency domain feature of the first transfer function is compared with the preset frequency domain feature, the wearing status of the wireless headset 100 can be determined.

In a possible implementation scenario, the frequency domain feature of the first transfer function includes a frequency response of the first transfer function in a third frequency range. The processor 110 may perform frequency domain transformation (for example, the Fourier transform) on the first transfer function, to obtain a frequency response corresponding to the first transfer function, and then extract a frequency domain feature corresponding to the third frequency range from the frequency response. Then, the wearing status of the wearable device is determined based on the frequency domain feature of the first transfer function in the third frequency range and a second frequency domain feature.

The third frequency range is set corresponding to a frequency range of the second audio signal. Specifically, when the first audio signal is an infrasound signal, a spectrum feature of the first transfer function is stable and obvious at a frequency corresponding to the spectrum feature. Therefore, when the second audio signal is the infrasound signal, the third frequency range may be a frequency range centered on a single frequency or a frequency range corresponding to the second audio signal. For example, the frequency of the second audio signal is 5 Hz. To avoid a frequency offset, the third frequency range may be a frequency range near 5 Hz, for example, 4 Hz to 6 Hz, 3 Hz to 6 Hz, or 2 Hz to 10 Hz. If the frequency of the second audio signal is 5 Hz to 10 Hz, the third frequency range may be 4 Hz to 11 Hz, 3 Hz to 12 Hz, 2 Hz to 15 Hz, or the like. Different from the infrasound signal, the audible domain signal has a wide frequency range, and features presented in different frequency ranges are different. According to analysis, when the second audio signal is the audible domain signal, the spectrum feature of the first transfer function is stable and obvious in a low frequency band. Therefore, when the second audio signal is the audible domain signal, the third frequency range may be a range corresponding to a low frequency band in an audible domain range. Specifically, the third frequency range may be 20 Hz to 300 Hz or a sub-range thereof, or may be a range greater than 20 Hz to 300 Hz or a sub-range thereof.

Figure 6:
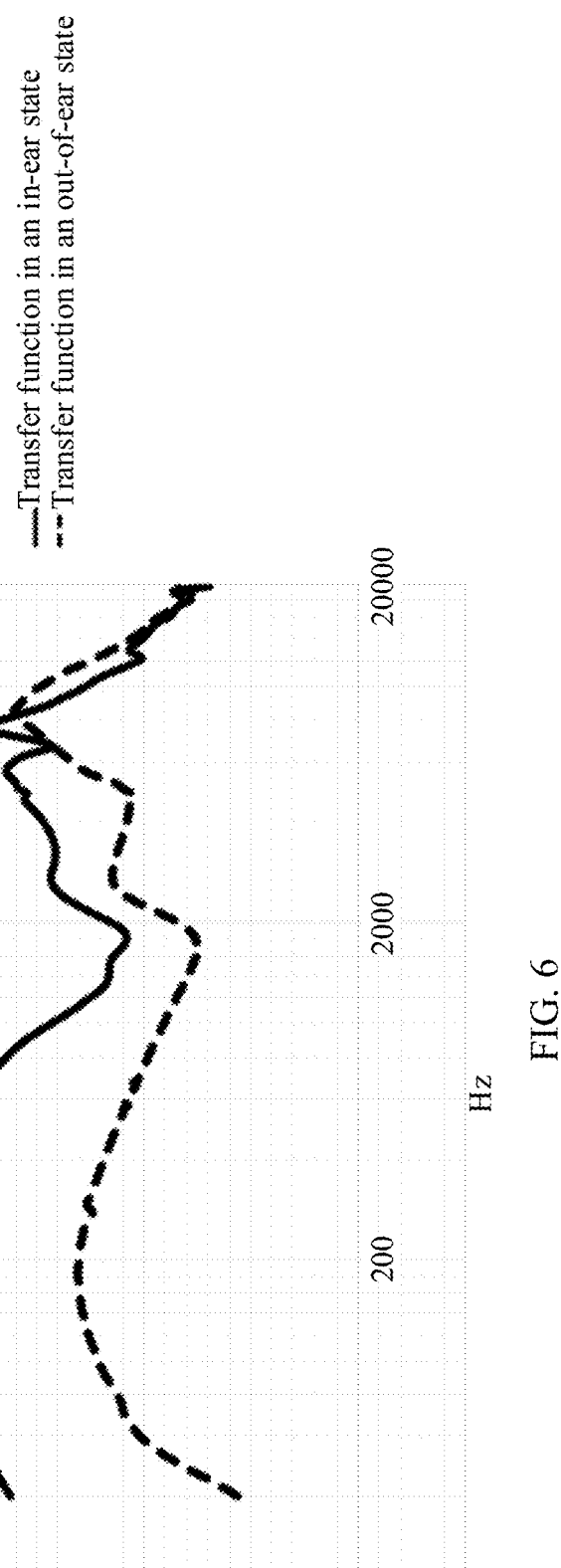
FIG. 6 is an example diagram of frequency responses of transfer functions in an in-ear state and an out-of-ear state according to an embodiment of this application.

The second frequency domain feature is preset on the processor 110, and is a frequency domain feature that is used to determine the wearing status and that is set based on a rule and a feature presented by frequency responses of transfer functions when the wireless headset 100 in the in-ear state and the out-of-ear state. Specifically, the second frequency domain feature is also set based on a rule and a feature presented by the frequency in which the second audio signal is located. FIG. 6 shows the frequency responses of the transfer functions in the in-ear state and the out-of-ear state when the second audio signal is the audible domain signal. It can be seen that a difference between the two is obvious in a low frequency band. With this feature, the second frequency domain feature may be set based on the frequency domain features of the transfer functions in the in-ear state and the out-of-ear state. For example, the second frequency domain feature may be a similar frequency response curve simulated between frequency response curves of the transfer functions in the in-ear state and the out-of-ear state. Alternatively, the second frequency domain feature may be a first transfer function amplitude threshold that is set based on maximum amplitudes of the two frequency response curves. Alternatively, the second frequency domain feature may be a plurality of sampling amplitudes obtained by sampling the simulated frequency response curve. Certainly, the second frequency domain feature may alternatively be set in another manner with reference to the frequency responses of the transfer functions in the in-ear state and the out-of-ear state. This is not specifically limited in this application.

In general, if the second audio signal preset by the processor 110 is the infrasound signal, the third frequency range is also set based on a frequency feature of the infrasound signal. The second frequency domain feature is also set based on features presented by the transfer functions in the in-ear state and the out-of-ear state after the infrasound signal is transmitted. Similarly, if the second audio signal preset by the processor 110 is the audible domain signal, the third frequency range is also set in the low frequency band based on a frequency feature of the audible domain signal. The second frequency domain feature is also set based on features presented by the transfer functions in the in-ear state and the out-of-ear state in the low frequency band after the audible domain signal is transmitted.

Further, because the frequency domain feature we are concerned about is mainly in a low frequency band of an audible domain or an infrasound signal frequency band, a high frequency component may be further filtered out by using a low-pass filter after frequency domain transformation is performed on the first transfer function, thereby reducing interference in subsequent analysis.

Further, the frequency domain feature of the first transfer function in the third frequency range is also corresponding to the second frequency domain feature. The frequency domain feature herein may be a frequency response curve, a maximum amplitude in the frequency response curve, amplitudes of a plurality of sampling frequencies corresponding to the frequency response curve, or the like. For different frequency domain features, different methods may be used to determine the wearing status.

In a possible implementation, the frequency domain feature of the first transfer function in the third frequency range may be a maximum magnitude of the frequency response of the first transfer function in the third frequency range, and the second frequency domain feature may be the first transfer function amplitude threshold. The processor 110 may compare the maximum amplitude of the frequency response of the first transfer function in the third frequency range with the first transfer function amplitude threshold, to determine the wearing status of the wireless headset 100. Specifically, if the maximum amplitude of the frequency response of the first transfer function in the third frequency range is greater than or equal to the first transfer function amplitude threshold, the processor 110 may determine that the wireless headset 100 is in the in-ear state. If the maximum amplitude of the frequency response of the first transfer function in the third frequency range is less than the first transfer function amplitude threshold, the processor 110 may determine that the wireless headset 100 is in the out-of-ear state.

In another possible implementation, the frequency domain feature of the first transfer function in the third frequency range may be a frequency response curve in the third frequency range. The second frequency domain feature is also a frequency response curve preset based on features corresponding to the in-ear state and the out-of-ear state, and is denoted as a second frequency response. The processor 110 may determine a fourth cross-correlation coefficient between the frequency response of the first transfer function in the third frequency range and the second frequency response, and then determine the wearing status of the wireless headset 100 based on the fourth cross-correlation coefficient and a fourth correlation threshold. Specifically, a cross-correlation coefficient may be a result obtained by calculating a cross-correlation function of two signals, and indicates a degree of similarity between the two signals. There are a plurality of manners for calculating the cross-correlation coefficient. This is not specifically limited in this application. In this embodiment of this application, the fourth cross-correlation coefficient between the curve of the frequency response of the first transfer function in the third frequency range and a preset curve of the second frequency response may be calculated, that is, a degree of similarity between the two may be determined, and then the fourth cross-correlation coefficient is compared with the preset fourth correlation threshold. If the fourth cross-correlation coefficient is greater than or equal to the fourth correlation threshold, the processor 110 may determine that the wireless headset 100 is in the in-ear state. If the fourth cross-correlation coefficient is less than the fourth correlation threshold, the processor 110 may determine that the wireless headset 100 is in the out-of-ear state. The fourth correlation threshold may be specifically set based on a specific situation, for example, 90%. This is not specifically limited in this application.

In still another possible implementation, the frequency domain feature of the first transfer function in the third frequency range may be amplitudes corresponding to a plurality of sampling frequencies of the frequency response of the first transfer function in the third frequency range. The second frequency domain feature is also amplitudes corresponding to a plurality of sampling frequencies of the second frequency response that are preset based on the features corresponding to the in-ear state and the out-of-ear state. The processor 110 may compare the amplitudes corresponding to the plurality of sampling frequencies of the frequency response of the first transfer function with the preset amplitudes corresponding to the plurality of sampling frequencies in a one-to-one correspondence. When amplitudes that exceed a specific proportion in sampling amplitudes of the first transfer function are all greater than or equal to corresponding preset amplitudes, the processor 110 may determine that the wireless headset 100 is in the in-ear state. Otherwise, the processor 110 may determine that the wireless headset 100 is in the out-of-ear state.

Refer to FIG. 4. In another possible implementation, after S101, the processor 110 may perform S1023. The following describes this technical solution.

S1023: The processor 110 obtains a signal feature of the third audio signal, and determines the wearing status of the wearable device based on the signal feature of the third audio signal.

It may be understood that the headset is in a closed space in the in-ear state, and is in an open space in the out-of-ear state. Therefore, when the speaker 140 outputs a same second audio signal, a third audio signal captured by the Fb-mic 131 when the wireless headset 100 is in the in-ear state is different from a third audio signal captured by the Fb-mic 131 when the wireless headset 100 is in the out-of-ear state. Therefore, in the embodiment shown in FIG. 4 of this application, the wearing status of the wearable device is determined by directly analyzing the feature of the third audio signal obtained in S101.

Specifically, an implementation of S1023 is similar to an implementation of S1021 and S1022. A main difference lies in that in S1021 and S1022, the signal feature of the first transfer function needs to be extracted, and a signal feature preset based on a rule and a feature presented by the first transfer function of the wireless headset 100 in the in-ear state and the out-of-ear state is compared with the signal feature of the first transfer function. However, in S1023, the signal feature of the third audio signal needs to be extracted, and a signal feature preset based on a rule and a feature of the third audio signal presented by the wireless headset 100 in the in-ear state and the out-of-ear state is compared with the signal feature of the third audio signal. The reason why the manner of S1023 can be used is that the second audio signal in this embodiment of this application is a preset known signal. Therefore, when the wireless headset 100 is excited by the second audio signal, a regularity feature of the audio signal captured by the microphone in the in-ear state and the out-of-ear state is used as a judgment standard, and the transfer function does not need to be further obtained. Therefore, an algorithm is simpler, and detection is faster.

The following mainly describes a difference between S1023 and S1022. For other parts, refer to a corresponding part of S1022.

In this embodiment of this application, the signal feature may include various parameters, functions, graphs, or the like that represent the signal feature, and specifically include various time domain features and frequency domain features that are obtained through time domain analysis and frequency domain analysis. Specifically, the processor 110 may extract a frequency domain feature of the third audio signal. The frequency domain feature herein may include characteristic curves obtained by performing frequency domain transformation on a frequency response, a spectrum, an energy spectrum, a power spectrum, and the like, and may alternatively include features such as an amplitude, an energy value, and a power value further extracted from these characteristic curves. The processor 110 compares the extracted frequency domain feature with a frequency domain feature preset on the processor 110, to determine whether the wireless headset 100 is in the in-ear state or the out-of-ear state.

In a possible implementation scenario, the frequency domain feature of the third audio signal includes a frequency response of the third audio signal in a second frequency range. The processor 110 may perform frequency domain transformation (for example, the Fourier transform) on the third audio signal, to obtain a frequency response corresponding to the third audio signal, and then extract a frequency domain feature corresponding to the second frequency range from the frequency response. Then, the wearing status of the wearable device is determined based on the frequency domain feature of the third audio signal in the second frequency range and a first frequency domain feature.

The second frequency range is also set corresponding to the frequency range of the second audio signal. For a specific setting manner, refer to the setting manner of the second frequency range in S1022. Details are not described herein again. The first frequency domain feature is preset on the processor 110, and is a frequency domain feature that is used to determine the wearing status and that is set based on a rule and a feature presented by a frequency response of the third audio signal of the wireless headset 100 in the in-ear state and the out-of-ear state. Specifically, the first frequency domain feature is also set based on the rule and the feature presented by the frequency in which the second audio signal is located.

Figure 7:
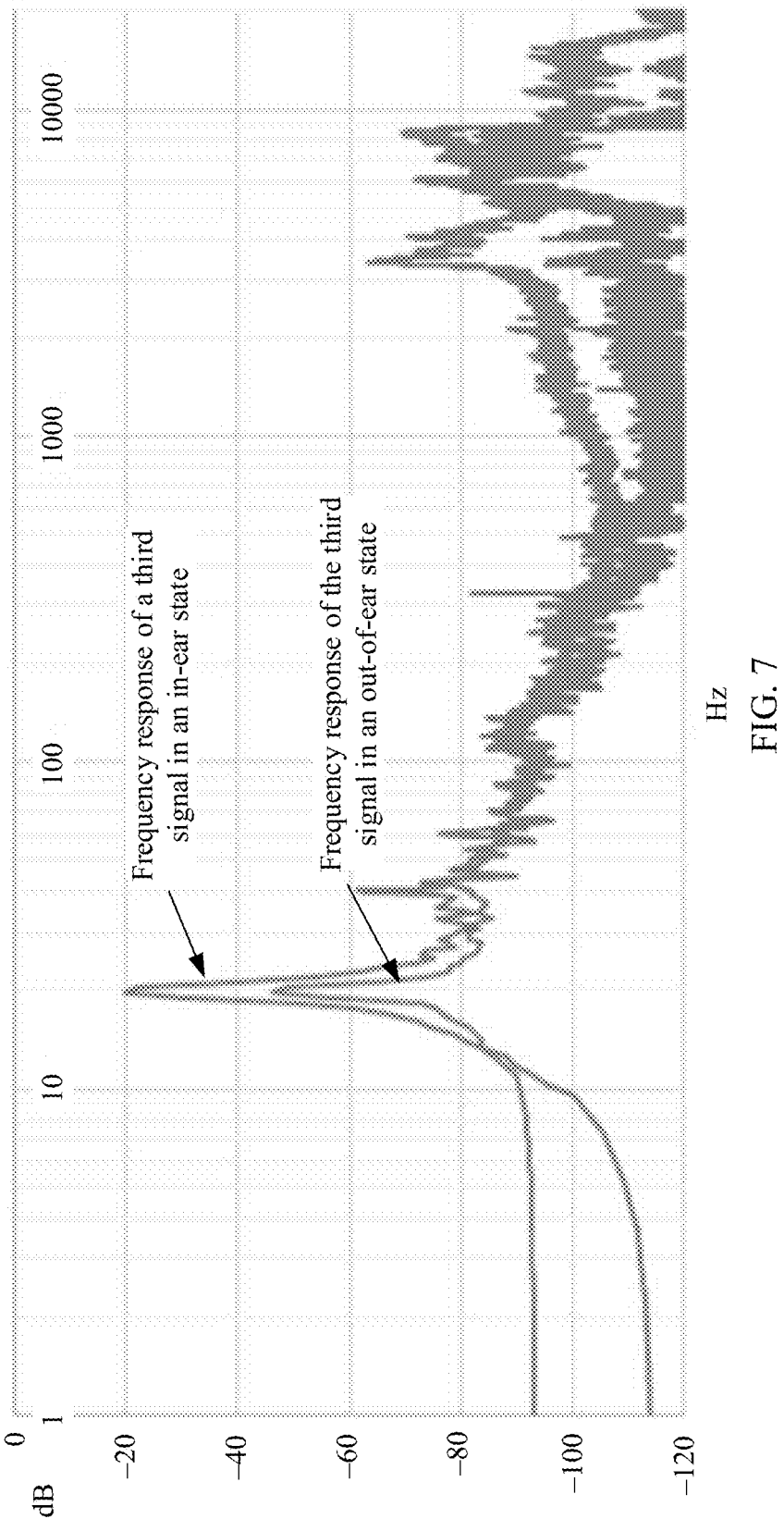
FIG. 7 is an example diagram of frequency responses of a third audio signal in an in-ear state and an out-of-ear state according to an embodiment of this application.

FIG. 7 shows frequency responses of the third audio signal in the in-ear state and the out-of-ear state when the second audio signal is an infrasound signal close to 20 Hz. It can be seen that a difference between the two frequency responses is obvious near 20 Hz. With this feature, the first frequency domain feature may be set based on the frequency domain features of the third audio signal in the in-ear state and the out-of-ear state. For example, the first frequency domain feature may be a similar frequency response curve simulated between frequency response curves of the third audio signal in the in-ear state and the out-of-ear state near 20 Hz. Alternatively, the first frequency domain feature may be a third signal amplitude threshold that is set based on maximum amplitudes of the two frequency response curves. Alternatively, the first frequency domain feature may be a plurality of sampling amplitudes obtained by sampling the simulated frequency response curve. Certainly, the first frequency domain feature may alternatively be set in another manner with reference to the frequency responses of the third audio signal in the in-ear state and the out-of-ear state. This is not specifically limited in this application.

In general, if the second audio signal preset by the processor 110 is the infrasound signal, the second frequency range is also set based on a frequency feature of the infrasound signal. The first frequency domain feature is also set based on a feature presented by the third audio signal in the in-ear state and the out-of-ear state after the infrasound signal is transmitted. Similarly, if the second audio signal preset by the processor 110 is the audible domain signal, the second frequency range is also set in the low frequency band based on a frequency feature of the audible domain signal. The first frequency domain feature is also set based on a feature of the third audio signal presented in the low frequency band in the in-ear state and the out-of-ear state after the audible domain signal is transmitted.

Further, because the frequency domain feature we are concerned about is mainly in a low frequency band of the audible domain or an infrasound signal frequency band, a high frequency component may be further filtered out by using a low-pass filter after frequency domain transformation is performed on the third audio signal, thereby reducing interference in subsequent analysis.

Further, the frequency domain feature of the third audio signal in the second frequency range is also corresponding to the first frequency domain feature. The frequency domain feature herein may be a frequency response curve, a maximum amplitude in the frequency response curve, amplitudes of a plurality of sampling frequencies corresponding to the frequency response curve, or the like. For different frequency domain features, different methods may be used to determine the wearing status.

In a possible implementation, the frequency domain feature of the third audio signal in the second frequency range may be a maximum magnitude of a response frequency of the third audio signal in the second frequency range, and the first frequency domain feature may be the third signal amplitude threshold. The processor 110 may compare the maximum amplitude of the response frequency of the third audio signal in the second frequency range with the third signal amplitude threshold, to determine the wearing status of the wireless headset 100. Specifically, if the maximum amplitude of the response frequency of the third audio signal in the second frequency range is greater than or equal to the third signal amplitude threshold, the processor 110 may determine that the wireless headset 100 is in the in-ear state. If the maximum amplitude of the response frequency of the third audio signal in the second frequency range is less than the third signal amplitude threshold, the processor 110 may determine that the wireless headset 100 is in the out-of-ear state.

In another possible implementation, the frequency domain feature of the third audio signal in the second frequency range may be a response frequency curve in the second frequency range. The first frequency domain feature is also a response frequency curve preset based on the feature corresponding to the in-ear state and the out-of-ear state, and is denoted as a first frequency response. The processor 110 may determine a third cross-correlation coefficient between the frequency response of the third audio signal in the second frequency range and the first frequency response, and then determine the wearing status of the wireless headset 100 based on the third cross-correlation coefficient and a third correlation threshold. The third cross-correlation coefficient is compared with the preset third correlation threshold. If the third cross-correlation coefficient is greater than or equal to the third correlation threshold, the processor 110 may determine that the wireless headset 100 is in the in-ear state. If the third cross-correlation coefficient is less than the third correlation threshold, the processor 110 may determine that the wireless headset 100 is in the out-of-ear state. The third correlation threshold may be specifically set based on a specific situation, for example, 90%. This is not specifically limited in this application.

In still another possible implementation, the frequency domain feature of the third audio signal in the second frequency range may be amplitudes corresponding to a plurality of sampling frequencies of the frequency response of the third audio signal in the second frequency range. The first frequency domain feature is also the amplitudes corresponding to the plurality of sampling frequencies of the second frequency response that are preset based on the feature corresponding to the in-ear state and the out-of-ear state. The processor 110 may compare the amplitudes corresponding to the plurality of sampling frequencies of the frequency response of the third audio signal with the preset amplitudes corresponding to the plurality of sampling frequencies in a one-to-one correspondence. When amplitudes that exceed a specific proportion in the sampling amplitudes of the third audio signal are all greater than or equal to corresponding preset amplitudes, the processor 110 may determine that the wireless headset 100 is in the in-ear state. Otherwise, the processor 110 may determine that the wireless headset 100 is in the out-of-ear state.

When the wireless headset 110 does not play audio, further, in a possible implementation, when determining that the wireless headset 100 is in the in-ear state, the processor 110 may send, by using a communication module 160, an audio play instruction to a terminal device connected to the wireless headset 100. After receiving the audio play instruction, the terminal device may play corresponding audio based on a previous play record. Certainly, the terminal device may alternatively perform operations such as playing audio randomly. This is not specifically limited in this embodiment of this application. In another possible implementation, the processor 110 may alternatively send, by using the communication module 160, first wearing indication information to the terminal device connected to the wireless headset 100. The first wearing indication information indicates that the wireless headset 100 is in the in-ear state. After receiving the first wearing indication information, the terminal device may perform a plurality of operation behaviors. For example, the terminal device may play audio, or may output a prompt message to prompt the user whether to play audio, or may record a current wearing state of the wireless headset 100 as the in-ear state in a memory, and change a wearable device access status icon on a display. Further, if the terminal device is playing audio by using a speaker of the terminal device or/and capturing a sound signal by using a microphone of the terminal device at this time, after receiving the first wearing indication information, the terminal device may further send, to the speaker 140 of the wireless headset 100 for playing, an audio signal originally sent to the speaker of the terminal device, and capture a sound signal by using the microphone 130 of the wireless headset 100. In specific implementation, any related operation based on the in-ear state may be implemented. This is not specifically limited in this embodiment of this application.

When the wireless headset 110 does not play audio and when the processor 110 determines that the wireless headset 100 is in the out-of-ear state, the processor 110 may not perform any operation, or may send, by using the communication module 160, second wearing indication information to the terminal device connected to the wireless headset 100. The second wearing indication information indicates that the wireless headset 100 is in the out-of-ear state. Further, the processor 110 may further start timing from a time at which it is determined that the wireless headset 100 is in the out-of-ear state. If timing duration exceeds a specific threshold and no indication information indicating that the wearing status of the wireless headset 100 is changed to the in-ear state is received in a timing process, functional components such as the microphone 130 and the speaker 140 of the wireless headset 110 may be disabled, so that the wireless headset 110 is in a standby state, and power consumption of the wireless headset 110 is reduced. When a wake-up indication is received or a sensor detects that the wireless headset 100 is lifted, the disabled functional components may be enabled and a specific operation is performed based on a specific scenario.

It should be noted that, in an implementation scenario of the paired wireless headsets 100 shown in FIG. 2C, the processor 110 may perform a subsequent operation based on wearing status of the two wireless headsets 100. For example, as long as any wireless headset 100 is in the in-ear state, the foregoing operations that need to be performed by the wireless headset 100 or the terminal device when the wireless headset 100 is in the in-ear state may be performed. Alternatively, the foregoing operations that need to be performed by the wireless headset 100 or the terminal device when the wireless headset 100 is in the in-ear state may be performed only when the pair of wireless headsets 100 are in the in-ear state. Similarly, as long as any wireless headset 100 is in the out-of-ear state, the foregoing operations that need to be performed by the wireless headset 100 or the terminal device when the wireless headset 100 is in the out-of-ear state may be performed. Alternatively, the foregoing operations that need to be performed by the wireless headset 100 or the terminal device when the wireless headset 100 is in the out-of-ear state may be performed only when the pair of wireless headsets 100 are in the in-ear state.

Further, in the implementation scenario shown in FIG. 2C, one of the two wireless headsets 100 may be used as a primary headset, and the other may be used as an auxiliary headset. The auxiliary headset may send a wearing status of the auxiliary headset to the primary headset, and the primary headset sends wearing statuses (the first/second wearing indication information) of the two headsets to the terminal device together.

Further refer to FIG. 3 and FIG. 4. If the processor 110 determines that the wearable device is currently playing audio, S103 to S105 may be performed. Specific description is provided below.

S103: The processor 110 obtains the fifth audio signal captured by the microphone 140.

Specifically, the wireless headset 100 is playing audio. Because the processor 110 is the control center of the wearable device, for the fourth audio signal being played by the wireless headset 100, the processor 110 may have previously obtained, by using the communication module 160, the fourth audio signal sent by the terminal device. Alternatively, the processor 110 may have stored the first audio signal inside, and therefore the processor 110 has actually obtained the fourth audio signal. In this case, the speaker 140 outputs the fourth audio signal. Because the speaker 140 plays the fourth audio signal to generate a sound signal, the Fb-mic 131 immediately captures the fifth audio signal. Simply speaking, the Fb-mic 131 captures the sound signal at a moment when the speaker 140 converts the fourth audio signal into the sound signal for output. In addition, the Fb-mic 131 converts the sound signal into the fifth audio signal, and sends the fifth audio signal to the processor 110.

S104: The processor 110 determines a second transfer function between the microphone 130 and the speaker 140 based on the fourth audio signal that is being played and the fifth audio signal.

In this embodiment of this application, an output is equivalent to the fifth audio signal (the audio signal captured by the Fb-mic 131), and an input is equivalent to the fourth audio signal (the audio signal output by the speaker 140). Therefore, a ratio of the fifth audio signal to the fourth audio signal may be used as the first transfer function. In specific implementation, the ratio of the fifth audio signal to the fourth audio signal may be directly calculated based on time domain signals of the third audio signal and the second audio signal, or some transformation may be performed on the fifth audio signal and the fourth audio signal first the ratio of the fifth audio signal to the fourth audio signal is calculated. For example, the first transfer function may be calculated based on a ratio of a Laplacian transform of the fifth audio signal to a Laplacian transform of the fourth audio signal, or the second transfer function may be calculated based on a ratio of a Fourier transform of the fifth audio signal to a Fourier transform of the fourth audio signal. Actually, the ratio of the fourth audio signal to the fifth audio signal may alternatively be used as the second transfer function. There are a plurality of manners of calculating the second transfer function. This is not limited in this application. Any function that can represent a relationship between the fifth audio signal and the fourth audio signal can be the second transfer function specified in this embodiment of this application.

It should be noted that the fourth audio signal in this embodiment of this application may be an audio signal in an audio playing scene such as music or a video, but is not a preset audio signal. Therefore, a frequency range of the fourth audio signal is an audible domain signal that can be sensed by the human ear, that is, an audio signal with a frequency range of 20 Hz to 20000 Hz. In addition, because the fourth audio signal is a non-preset audio signal, the fourth audio signal is generally a signal with a frequency range (for example, 100 Hz to 1000 Hz).

S105: The processor 110 obtains frequency domain information of the second transfer function, and determines the wearing status of the wearable device based on the frequency domain information of the second transfer function.

Specifically, the processor 110 may extract the frequency domain information of the second transfer function. The frequency domain information herein may include characteristic curves obtained by performing frequency domain transformation on a frequency response, a spectrum, an energy spectrum, a power spectrum, and the like, and may alternatively include frequency domain features such as an amplitude, an energy value, and a power value further extracted from these characteristic curves. The processor 110 compares the extracted frequency domain information with frequency domain information preset on the processor 110, to determine whether the wireless headset 100 is in the in-ear state or the out-of-ear state. The frequency domain information preset on the processor 110 is set based on a feature of the frequency domain information of the wireless headset 100 in the in-ear state and the out-of-ear state. Therefore, after the frequency domain information of the second transfer function is compared with the preset frequency domain information, the wearing status of the wireless headset 100 may be determined.

In a possible implementation scenario, a frequency domain feature of the second transfer function includes a frequency response of the second transfer function in a fourth frequency range. The processor 110 may perform frequency domain transformation (for example, the Fourier transform) on the second transfer function, to obtain a frequency response corresponding to the second transfer function, and then extract a frequency domain feature corresponding to the fourth frequency range from the frequency response. Then, the wearing status of the wearable device is determined based on the frequency domain feature of the second transfer function in the fourth frequency range and a fourth frequency domain feature.

Because the fourth audio signal is the audible domain signal, the frequency domain feature of the second transfer function is stable and obvious in a low frequency band. Therefore, the fourth frequency range may be a range corresponding to a low frequency band in an audible domain range. Specifically, the fourth frequency range may be 20 Hz to 300 Hz or a sub-range thereof, or may be a range greater than 20 Hz to 300 Hz or a sub-range thereof.

The fourth frequency domain feature is preset on the processor 110, and is a frequency domain feature that is used to determine the wearing status and that is set based on a rule and a feature presented by the frequency response of the transfer function when the wireless headset 100 in the in-ear state and the out-of-ear state. Specifically, the fourth frequency domain feature is also set based on a rule and a feature presented by a low frequency band corresponding to the fourth audio signal.

For several methods in which the processor 110 determines the wearing status of the wearable device based on the frequency domain feature of the second transfer function in the fourth frequency range and the fourth frequency domain feature, refer to step S1022. Details are not described herein again.

Further, in a case in which the wireless headset 110 plays audio, when the processor 110 determines that the wireless headset 100 is in the in-ear state, the processor 110 may not perform any operation, that is, the wireless headset 100 continues to play audio. Alternatively, the processor 110 may send, by using the communication module 160, the first wearing indication information to the terminal device connected to the wireless headset 100. The first wearing indication information indicates that the wireless headset 100 is in the in-ear state. After receiving the first wearing indication information, the terminal device may perform a plurality of operation behaviors. For example, a current wearing state of the wireless headset 100 may be recorded as the in-ear state in the memory.

In a case in which the wireless headset 110 plays audio, in a possible implementation, when determining that the wireless headset 100 is in the out-of-ear state, the processor 110 may send, by using the communication module 160, an audio play stop instruction to the terminal device connected to the wireless headset 100. After receiving the audio play stop instruction, the terminal device may pause or stop audio currently being played. In another possible implementation, the processor 110 may alternatively send, by using the communication module 160, the second wearing indication information to the terminal device connected to the wireless headset 100. The second wearing indication information indicates that the wireless headset 100 is in the out-of-ear state. After receiving the second wearing indication information, the terminal device may perform a plurality of operation behaviors. For example, the terminal device may stop playing audio, or may output a prompt message to prompt the user whether to stop playing audio, or may record a current wearing state of the wireless headset 100 as the out-of-ear state in the memory, and change the wearable device access status icon on the display. Further, if the terminal device is performing communication (for example, a voice call or a video call) by using the wireless headset 100 at this time, after receiving the second wearing indication information, the terminal device may send, to the speaker of the terminal device for playing, an audio signal originally sent to the speaker 140 of the wireless headset 100, and captures a sound signal by using the speaker of the terminal device. In specific implementation, any related operation based on the out-of-ear state may be implemented. This is not specifically limited in this embodiment of this application.

Further, the processor 110 may further start timing from a time at which it is determined that the wireless headset 100 is in the out-of-ear state. If timing duration exceeds a specific threshold and no indication information indicating that the wearing status of the wireless headset 100 is changed to the in-ear state is received in a timing process, functional components such as the microphone 130 and the speaker 140 of the wireless headset 110 may be disabled, so that the wireless headset 110 is in a standby state, and power consumption of the wireless headset 110 is reduced. When a wake-up indication is received or a sensor detects that the wireless headset 100 is lifted, the disabled functional components may be enabled and a specific operation is performed based on a specific scenario.

It can be learned that, in the embodiments shown in FIG. 3 and FIG. 4 of this application, the processor 110 does not perform wearing detection by using a plurality of types of sensor data, but the microphone 130 and the speaker 140 in the wearable device are reused. Based on a relationship between the audio signal output by the speaker 140 and the audio signal captured by the microphone 130, and features of audio signals picked up by the wearable device in the in-ear state and the out-of-ear state, the wearing status of the wearable device is determined and a subsequent operation is further performed by cooperating with the connected terminal device, thereby reducing sensor stacking and increasing design flexibility of the wearable device. In addition, in this embodiment of this application, a case in which the wearable device does not play audio is distinguished from a case in which the wearable device plays audio. In the case in which the wearable device does not play audio, the processor 110 triggers output of the second audio signal and a subsequent wearing detection step only when the first audio signal is received. This avoids power consumption caused by the need to enable the speaker 140 and continuously outputting the second audio signal during continuous detection. In the case in which the wearable device plays audio, the processor 110 directly calculates the transfer function by using the audio that is being played, and does not need to output the second audio signal, thereby reducing unnecessary power consumption and a signal processing process.

In some usage cases, a case such as an accidental touch by the user may also trigger the microphone 130 of the wireless headset 100 to pick up a sound signal, and trigger the processor 110 to further perform wearing detection. If a surrounding environment generated in a case such as an accidental touch by the user is similar to a human ear environment, the wireless headset 100 may also be detected as the in-ear state. Alternatively, when the surrounding environment generated in a case such as an accidental touch by the user is similar to an open environment, the wireless headset 100 may also be detected as the out-of-ear state. In this case, the wearing status of the wearable device may be misidentified. Therefore, to further improve identification accuracy of wearing detection, and avoid misidentification caused by a case such as an accidental touch by the user, based on the embodiment shown in FIG. 3 or FIG. 4, when obtaining the first audio signal captured by the microphone 130, the processor 110 may first analyze the first audio signal, and determine whether a signal feature of the first audio signal meets a first wearing detection entry condition. When the entry condition is met, a subsequent wearing detection step is further performed. In this way, detection accuracy is further improved through secondary detection. When the entry condition is not met, the subsequent wearing detection step is not performed. In this way, power that needs to be consumed for output by the speaker and signal processing and analysis by the processor in subsequent wearing detection can be reduced, and energy consumption can be reduced.

FIG. 8 is a schematic flowchart of another wearing detection method according to an embodiment of this application. The following describes in detail the another wearing detection method with reference to FIG. 8.

S200: A processor 110 determines whether a wearable device plays audio. If no audio is played, S201 is performed, and if audio is being played, S204 to S206 are performed.

S201: When obtaining a first audio signal captured by a microphone 130, the processor 110 determines whether a signal feature of the first audio signal meets a first wearing detection entry condition. If the signal feature of the first audio signal meets the first wearing detection entry condition, S202 and S203 are performed.

A sound is generated instantaneously when a headset is in contact with a human ear when the headset is inserted into the ear, when the headset is accidentally touched by a user, or when the headset is touched in another case. In this case, an Fb-mic 131 receives a sound signal generated due to contact, converts the sound signal into the first audio signal, and sends the first audio signal to the processor 110. After obtaining the first audio signal, the processor 110 determines whether the signal feature of the first audio signal meets the first wearing detection entry condition. In this embodiment of this application, the signal feature may include various parameters, functions, graphs, or the like that represent the signal feature, and specifically include various time domain features and frequency domain features that are obtained through time domain analysis and frequency domain analysis. The first wearing detection entry condition is set based on a regularity feature of an audio signal generated when the user contacts the wireless headset 100 when the wireless headset 100 is inserted into and removed from the ear.

The following continues to describe in detail a method for determining whether the signal feature of the first audio signal meets the first wearing detection entry condition.

In this embodiment of this application, whether the signal feature of the first audio signal meets the first wearing detection entry condition may be determined from one or a combination of two dimensions: a time domain and a frequency domain.

In a possible implementation, whether the signal feature of the first audio signal meets the first wearing detection entry condition may be determined from the frequency domain dimension. The signal feature may be a spectrum feature, and S201 may specifically include the following.

S2011: The processor 110 obtains a spectrum feature of the first audio signal in a first frequency range.

S2012: The processor 110 determines a first cross-correlation coefficient between the spectrum feature of the first audio signal in the first frequency range and a first spectrum feature.

S2013: When the first cross-correlation coefficient reaches a first correlation threshold, the processor 110 determines that the signal feature of the first audio signal meets the first wearing detection entry condition, and then S202 and S203 are performed. Otherwise, it is determined that the signal feature of the first audio signal does not meet the first wearing detection entry condition, and S202 and S203 are not performed.

The following describes in detail the foregoing frequency domain dimension determining method.

Figure 9:
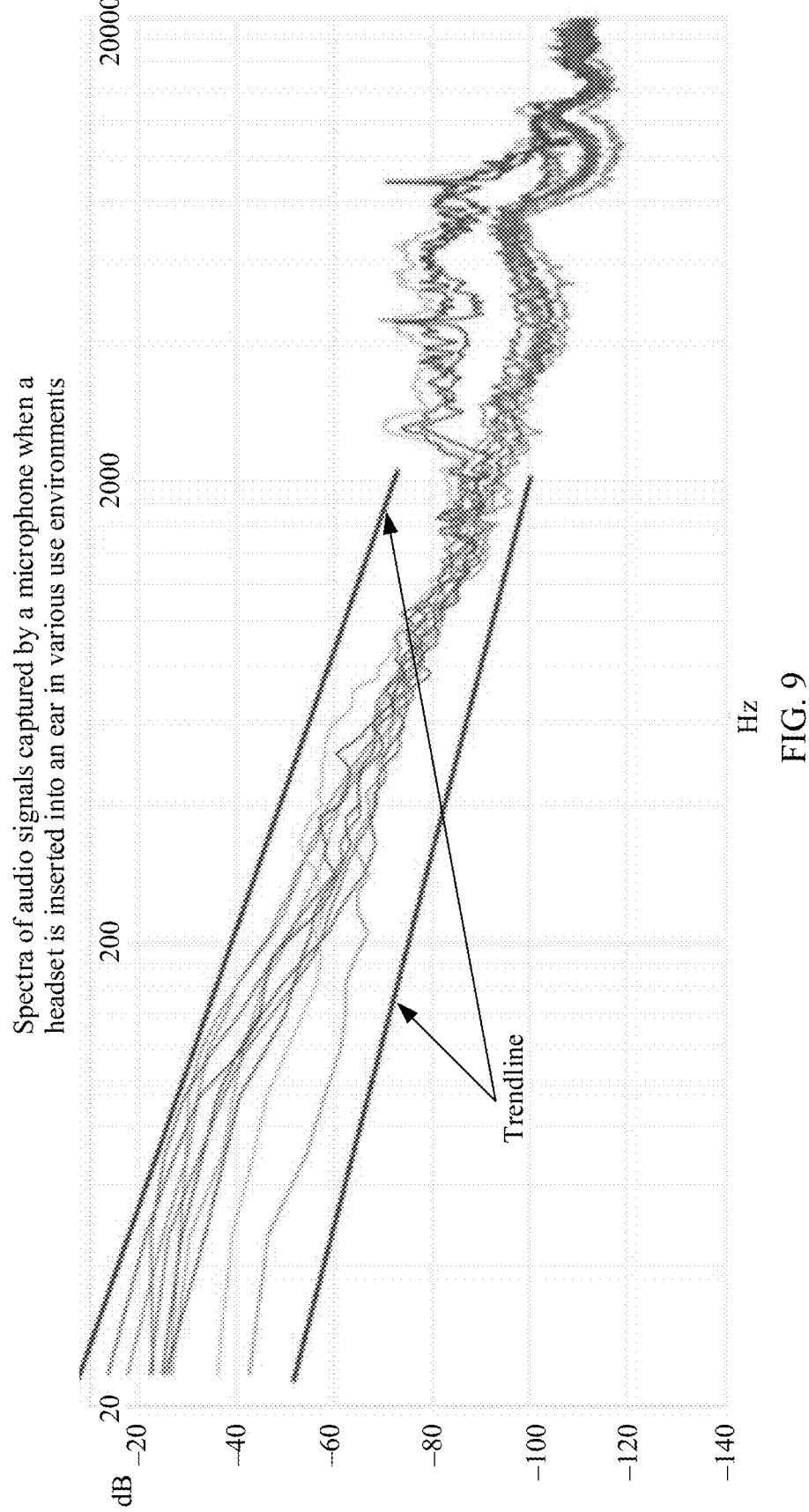
FIG. 9 is an example diagram of spectra of audio signals captured by a microphone when a headset is inserted into an ear in various use environments according to an embodiment of this application.
Figure 10:
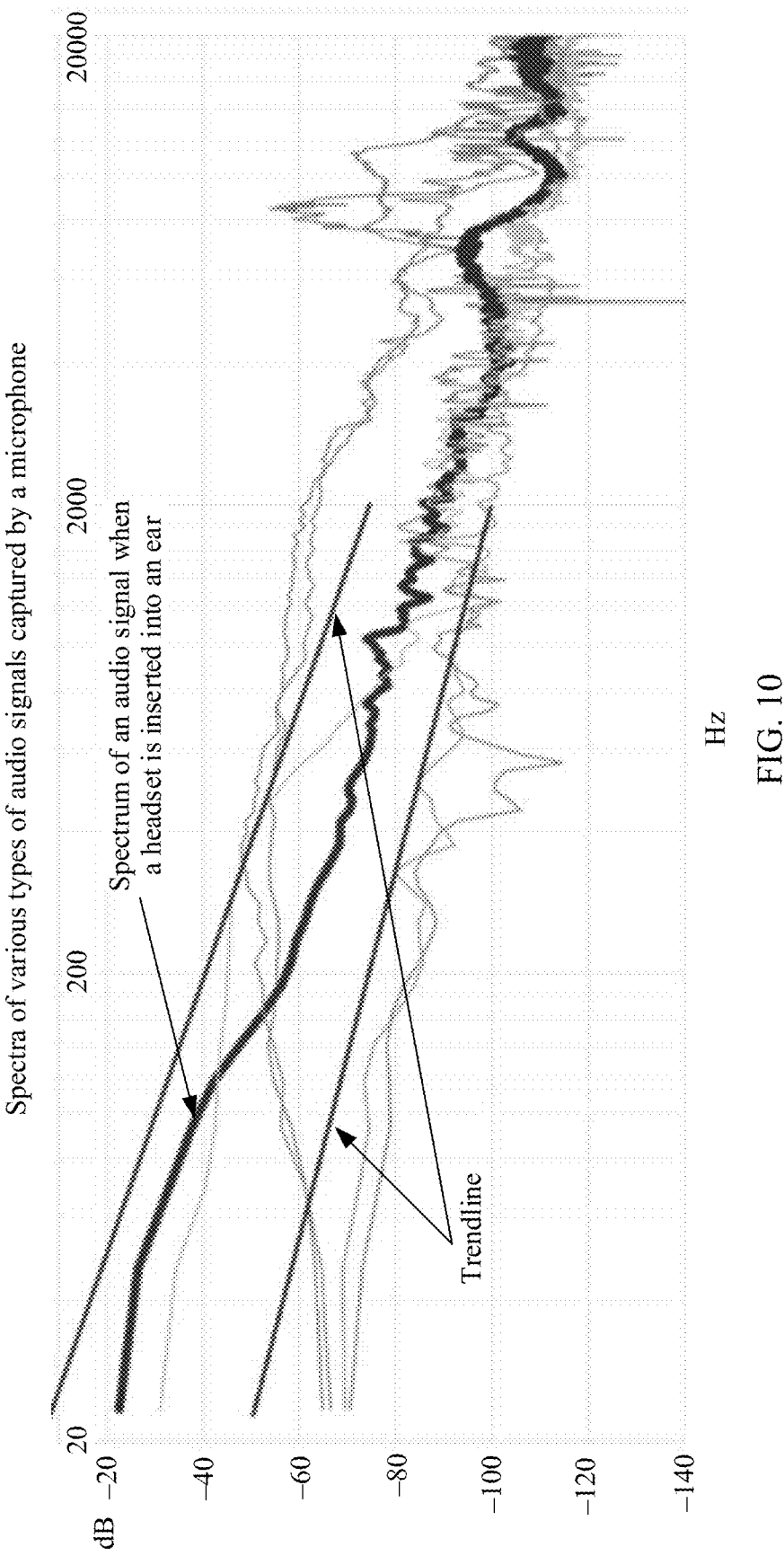
FIG. 10 is an example diagram of spectra of various types of audio signals received by a microphone according to an embodiment of this application.

Specifically, the processor 110 may perform frequency domain transformation (for example, Fourier transform) on the first audio signal, to obtain a spectrum corresponding to the first audio signal, and then extract the spectrum feature corresponding to the first frequency range in the spectrum. FIG. 9 shows spectra of audio signals received by the Fb-mic 131 when the headset is inserted into the ear in various usage environment scenes (for example, quietness, noise, and daily life). It can be learned that the spectra of the audio signals generated when the human ear is in contact with the Fb-mic 131 when the headset is inserted into the ear have good consistency in a low frequency band, to be specific, the spectra of the audio signals in various scenes converge in the low frequency band (spectrum curves between trendlines are similar), and this represents regularity. FIG. 10 shows spectra of various types of audio signals (for example, a sound of holding the headset by a hand, a sound of waves, a sound in a forest, and a sound of inserting the headset into the ear) received by the Fb-mic 131. It can be learned that, a spectrum of an audio signal when the headset is inserted into the ear and a spectrum of an audio signal of another sound have obvious differentiation in a low frequency band. An audio signal when the headset is removed from the ear also has a similar feature. In this application, only some scenes when the headset is inserted into the ear are used as examples. Therefore, based on features of audio signals generated when the human ear contacts the Fb-mic 131 when the headset is inserted into and removed from the ear, in different scenes, spectrum features of the audio signals when the headset is inserted into and removed from the ear in the low frequency band have obvious differentiation and good consistency with other noises. Therefore, the first frequency range herein may be a frequency range of a low frequency band set based on the feature, and may be specifically 20 Hz to 300 Hz or any sub-range within 20 Hz to 300 Hz, or may be a range greater than 20 Hz to 300 Hz and a sub-range thereof. This is not specifically limited in this application.

The first spectrum feature is preset on the processor 110, and is a frequency feature that is set based on a rule and a feature presented by an audio signal triggered after the wireless headset 100 is in contact with a human ear when the wireless headset 100 is inserted into and removed from the ear. Correspondingly, a frequency range of the first spectrum feature is also similar to the first frequency range.

In this embodiment of this application, the spectrum feature of the first audio signal in the first frequency range may be a spectrum curve in the first frequency range, and the first spectrum feature is also a spectrum curve preset based on the feature of the audio signal sent when the headset is inserted into and removed from the ear. Similar to the third cross-correlation coefficient mentioned above, the processor 110 may also calculate the first cross-correlation coefficient between the spectrum feature of the first audio signal in the first frequency range and the first spectrum feature by using a cross-correlation function, that is, determine a degree of similarity between the two. If the first cross-correlation coefficient reaches the first correlation threshold, it is determined that the signal feature of the first audio signal meets the first wearing detection entry condition. Otherwise, it is determined that the signal feature of the first audio signal does not meet the first wearing detection entry condition. The first correlation threshold may be specifically set based on a specific situation. This is not specifically limited in this application.

It should be noted that, to obtain a more accurate result, noise reduction processing may be further performed on the first audio signal before frequency domain transformation is performed on the first audio signal. After the frequency domain transformation is performed on the first audio signal, linear coordinates may be further converted to logarithmic coordinates to reduce data redundancy, and curve smoothing, that is, multi-point de-averaging, is performed on the obtained spectrum curve to obtain a smoother curve. Further, before the first cross-correlation coefficient is calculated, normalization processing may be further performed on the spectrum feature of the first audio signal in the first frequency range, so that the spectrum feature of the first audio signal in the first frequency range can be compared with the first spectrum feature in a same state. For the foregoing processing of noise reduction, linear coordinate conversion, curve smoothing, and normalization, a common processing algorithm in the signal processing field may be used. Details are not described herein in this application.

In another possible implementation, whether the signal feature of the first audio signal meets the first wearing detection entry condition may be determined from the time domain dimension. The signal feature may be a temporal envelope, and S201 may specifically include the following.

S2014: The processor 110 extracts a temporal envelope of the first audio signal.

S2015: The processor 110 determines a second cross-correlation coefficient between the temporal envelope of the first audio signal and a first temporal envelope.

S2016: When the second cross-correlation coefficient reaches a second correlation threshold, the processor 110 determines that the signal feature of the first audio signal meets the first wearing detection entry condition, and then S202 and S203 are performed. Otherwise, it is determined that the signal feature of the first audio signal does not meet the first wearing detection entry condition, and S202 and S203 are not performed.

Figure 11:
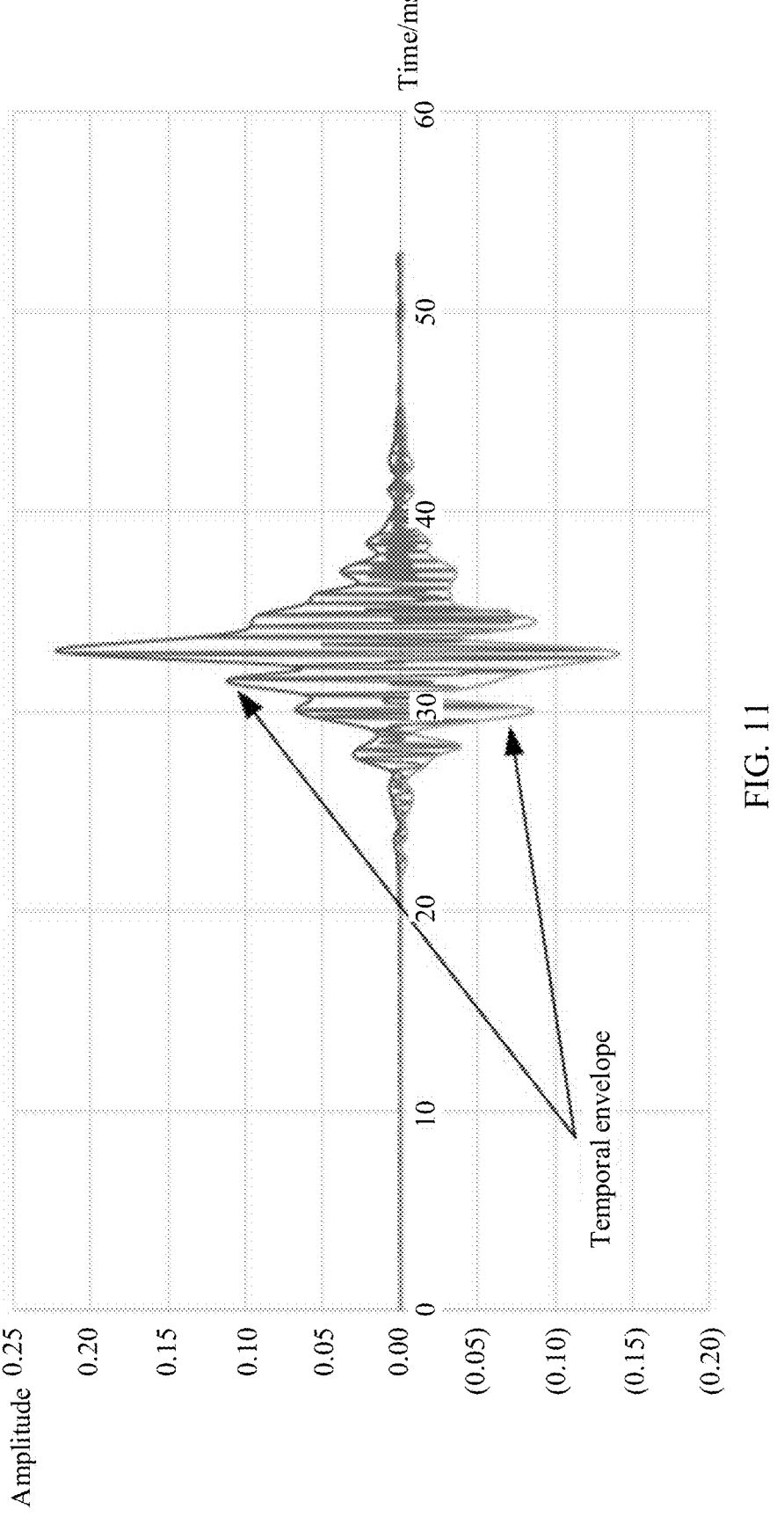
FIG. 11 is an example diagram of a temporal envelope according to an embodiment of this application.
Figure 12:
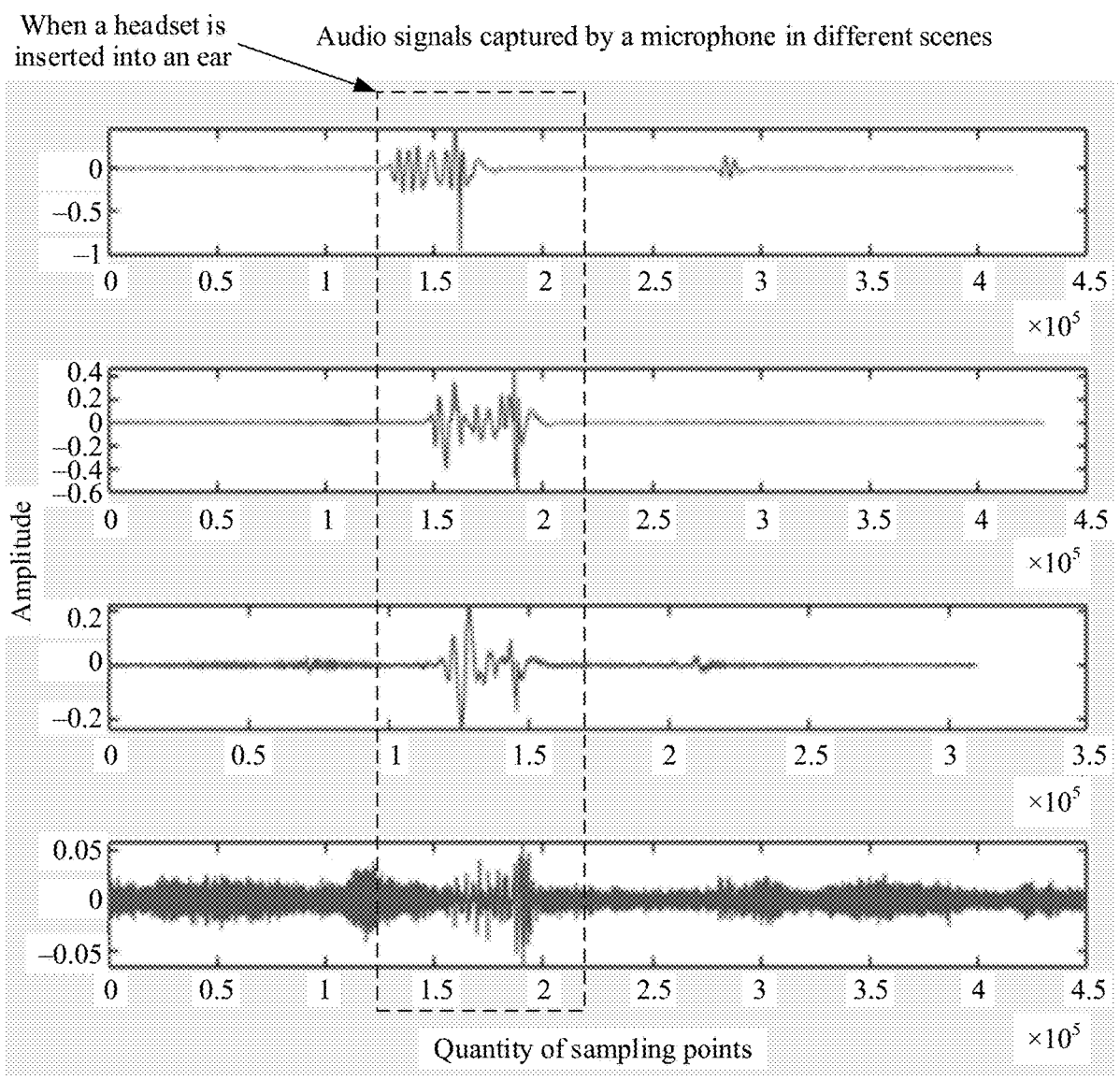
FIG. 12 is an example diagram of audio signals captured by a microphone in different scenes according to an embodiment of this application.

Specifically, FIG. 11 shows a temporal envelope corresponding to the first audio signal shown in FIG. 3. The processor 110 may divide the first audio signal into a plurality of segments, extract a maximum amplitude of each segment of signal, and then connect the amplitude maximum values corresponding to the plurality of segments of signal. An envelope curve is formed in the time domain. FIG. 12 shows audio signals received by the Fb-mic 131 in different scenes. A horizontal coordinate is a quantity of sampling points, and the quantity of sampling points/48000=time. It can be seen that the audio signal when the headset is inserted into the ear and an audio signal of another sound have obvious differentiation. In a fourth scene in FIG. 12, even in an environment with very high noise, the audio signal when the headset is inserted into the ear still has high differentiation. In addition, the first audio signals in the four scenes are also very similar and have consistency. An audio signal when the headset is removed from the ear also has a similar feature. In this application, only some scenes when the headset is inserted into the ear are used as examples. Therefore, based on the features of the audio signals generated when the human ear is in contact with the Fb-mic 131 when the headset is inserted into and removed from the ear, in different scenes, temporal envelopes of the audio signals when the headset is inserted into and removed from the ear have obvious differentiation and good consistency with other noise envelopes. Therefore, this may be used as a feature for determining whether the signal feature of the first audio signal meets the first wearing detection entry condition. It should be noted that, to obtain a more accurate result, noise reduction processing may be further performed on the first audio signal before time-domain envelope extraction is performed on the first audio signal.

The first temporal envelope is preset on the processor 110, and is a temporal envelope curve that is set based on the rule and the feature presented by the audio signal triggered after the wireless headset 100 is in contact with the human ear when the wireless headset 100 is inserted into and removed from the ear.

Similar to the first cross-correlation coefficient mentioned above, the processor 110 may alternatively calculate the second cross-correlation coefficient between the temporal envelope of the first audio signal and the first temporal envelope by using the cross-correlation function, that is, determine a degree of similarity between the two. If the second cross-correlation coefficient reaches the second correlation threshold, it is determined that the signal feature of the first audio signal meets the first wearing detection entry condition. Otherwise, it is determined that the signal feature of the first audio signal does not meet the first wearing detection entry condition. The second correlation threshold may be specifically set based on a specific situation. This is not specifically limited in this application.

In still another possible implementation scenario, the processor 110 may combine the foregoing two manners to determine both a frequency domain signal feature and a time domain signal feature. As long as any one of the frequency domain dimension and the time domain dimension meets a corresponding condition, the processor 110 determines that the signal feature of the first audio signal meets the first wearing detection entry condition. The processor 110 determines that the signal feature of the first audio signal does not meet the first wearing detection entry condition only when neither the frequency domain dimension nor the time domain dimension meets the corresponding condition. In other words, the processor 110 may perform steps S2011 to S2013 and S2014 to S2016, and determine that the signal feature of the first audio signal meets the first wearing detection entry condition as long as any one of two execution results is determined to meet the first wearing detection entry condition. An advantage of this is that a change of the wearing status that is not correctly identified due to false detection in the frequency domain dimension or the time domain dimension can be avoided.

It may be understood that in addition to the foregoing two methods for specifically determining whether the signal feature of the first audio signal meets the first wearing detection entry condition, another manner or a combination of a plurality of manners may be used in this embodiment of this application as long as it is possible to determine, based on the foregoing similar time/frequency domain information, whether preset time/frequency domain information of an audio signal having the in-ear or out-of-ear feature is matched. For example, in the frequency domain dimension, the signal feature may alternatively be a maximum amplitude in a spectrum corresponding to the first frequency range, and correspondingly, the first spectrum feature is also a preset amplitude threshold. Whether the first wearing detection entry condition is met is determined based on a comparison result between the two.

Further, to improve detection efficiency and reduce power consumption, before determining whether the signal feature of the first audio signal meets the first wearing detection entry condition, the processor 110 may first determine whether a signal amplitude of the first audio signal reaches a first signal amplitude threshold. When the first signal amplitude threshold is met, subsequent steps are performed. Otherwise, subsequent steps are not performed.

S202: The processor 110 outputs a second audio signal by using a speaker 140, and obtains a third audio signal captured by the microphone 130.

S203: The processor 110 obtains a signal feature of the third audio signal, and determines the wearing status of the wearable device based on the signal feature of the third audio signal.

Implementations of S202 and S203 are similar to implementations of S101 and S1023 in the foregoing embodiment. Therefore, for a specific implementation, refer to corresponding locations of S101 and S1023. Details are not described herein again. It should be noted that S203 herein is merely an example implementation, and S203 in this embodiment of this application may alternatively be implemented by using S1021 and S1022 in FIG. 3.

S204: The processor 110 obtains a fifth audio signal captured by the microphone 140.

S205: The processor 110 determines a second transfer function between the microphone 130 and the speaker 140 based on a fourth audio signal that is being played and the fifth audio signal.

S206: The processor 110 obtains frequency domain information of the second transfer function, and determines the wearing status of the wearable device based on the frequency domain information of the second transfer function.

Implementations of S204 to S206 are similar to implementations of S103 to S105 in the embodiment shown in FIG. 4. Therefore, for a specific implementation, refer to corresponding locations of S103 to S105. Details are not described herein again.

It can be learned that in the embodiment shown in FIG. 8 of this application, based on the embodiments shown in FIG. 3 and FIG. 4, the first wearing detection entry condition is added. Whether a trigger signal meets the first wearing detection entry condition is determined based on the trigger signal (the first audio signal) captured by the microphone 130 and a feature of the trigger signal picked up by the wearable device in an in-ear state and an out-of-ear state. Only when the first wearing detection entry condition is met, this indicates that the wireless headset 100 may be inserted into or removed from the ear, and the wearing status of the wearable device is further determined. In other words, according to one aspect, when the first wearing detection entry condition is met, in this embodiment of this application, audio signals generated in two different scenes, such as the first audio signal and the third audio signal, are detected in different manners. Double detection is performed on the two types of audio signals, so that accuracy of wearing detection can be improved to a greater extent, and a false detection rate can be reduced. According to another aspect, when the first wearing detection entry condition is not met, it indicates that the wireless headset 100 may be touched accidentally, or the like. In this case, the subsequent wearing detection step may not be performed, and the speaker is not turned on to output an audio signal, thereby reducing power consumption.

FIG. 13 is a schematic flowchart of another wearing detection method according to an embodiment of this application. In the embodiment in FIG. 13, a wireless headset 100 may include a plurality of types of sensors 170. Therefore, a processor 110 may determine, by analyzing sensor data captured by the sensors 170 in the wireless headset 110, whether further wearing detection needs to be performed. If a subsequent wearing detection step needs to be performed, precision of the wearing detection is improved by detecting the sensor data and an audio signal, and power consumption is reduced. This embodiment of this application may be applicable to the wireless headset 100 on which the various sensors 170 have been deployed. In other words, if some sensors 170 need to be disposed on the wireless headset 100 to implement other functions, the sensor data may be reused to determine a wearing entry condition. The following describes in detail the another wearing detection method with reference to FIG. 13.

S300: The processor 110 determines whether the wearable device plays audio. If no audio is played, S301 is performed, and if audio is being played, S304 to S306 are performed.

S301: The processor 110 determines whether the sensor data captured by the sensors meets a second wearing detection entry condition. If the sensor data meets the second wearing detection entry condition, S302 and S303 are performed.

The sensors 170 in the wireless headset 100 may capture sensor data in real time. When a status of the wireless headset 100 changes, the sensor data detected by the sensor 170 also changes. It may be understood that when a user wears the headset or removes the headset from an ear, the sensor data captured by the sensors 170 of the wireless headset 100 changes. In this embodiment of this application, this feature of the sensor data when the wireless headset 100 is inserted into and removed from the ear is used to determine whether the sensor data meets the second wearing detection entry condition.

Specifically, the sensors 170 may include a proximity sensor, and the processor 110 may determine, based on sensor data captured by the proximity sensor, whether an object approaches or moves away from the wearable device.

For example, the proximity sensor may be a capacitive proximity sensor 173, and the capacitive proximity sensor 173 may detect, by detecting a capacitance change, whether a specific substance approaches or moves away. Alternatively, the proximity sensor may be an optical proximity sensor 172, and the optical proximity sensor 172 determines, by detecting a reflected optical signal, whether a specific substance approaches or moves away.

It may be understood that when the wireless headset 100 starts to be inserted into the ear, the wireless headset 100 gradually approaches parts such as a human ear or a human face. Therefore, if the proximity sensor determines that the current wearable device is approaching a specific object, it may be determined that the sensor data meets the second wearing detection entry condition. When the wireless headset 100 starts to be removed from the ear, the wireless headset 100 gradually moves away from the parts such as the human ear or the human face. Therefore, if the proximity sensor determines that the current wearable device moves away from a specific object, it may also be determined that the sensor data meets the second wearing detection entry condition.

It should be noted that, in addition to the foregoing examples of the proximity sensor, in a specific implementation process, detection may alternatively be performed with reference to another sensor in the wireless headset 100, for example, with reference to an acceleration sensor 171. If it is found, based on sensor data of the acceleration sensor, that the wireless headset 100 is in a lifted state and is approaching a specific object. In this case, it may be determined that the sensor data meets the second wearing detection entry condition. Alternatively, if it is found, based on the sensor data of the acceleration sensor, that the wireless headset 100 is in a falling state and is moving away from a specific object, it may also be determined that the sensor data meets the second wearing detection entry condition.

In other words, if the sensor data meets the second wearing detection entry condition, there is a high probability that the headset is being inserted into or removed from the ear by the user. In this case, the processor 110 performs secondary detection by using a subsequent wearing detection method, to more accurately determine the wearing status of the wireless headset 100. In addition, power consumption caused by continuous output of a second audio signal during continuous detection is avoided.

S302: The processor 110 outputs the second audio signal by using a speaker 140, and obtains a third audio signal captured by a microphone 130.

S303: The processor 110 obtains a signal feature of the third audio signal, and determines the wearing status of the wearable device based on the signal feature of the third audio signal.

Implementations of S302 and S303 are similar to implementations of S101 and S1023 in the foregoing embodiment. Therefore, for a specific implementation, refer to corresponding locations of S101 and S1023. Details are not described herein again. It should be noted that S303 herein is merely an example implementation, and S303 in this embodiment of this application may alternatively be implemented by using S1021 and S1022 in FIG. 3.

S304: The processor 110 obtains a fifth audio signal captured by the microphone 140.

S305: The processor 110 determines a second transfer function between the microphone 130 and the speaker 140 based on a fourth audio signal that is being played and the fifth audio signal.

S306: The processor 110 obtains frequency domain information of the second transfer function, and determines the wearing status of the wearable device based on the frequency domain information of the second transfer function.

Implementations of S304 to S306 are similar to implementations of S103 to S105 in the embodiment shown in FIG. 4. Therefore, for a specific implementation, refer to corresponding locations of S103 to S105. Details are not described herein again.

It can be learned that, in the embodiment shown in FIG. 13 of this application, the sensor data captured by the existing sensors is reused to determine the wearing entry condition. The microphone 130 does not need to continuously monitor an external signal, and analyze and process the signal, but effect of secondary detection to improve wearing detection accuracy can also be achieved. In other words, according to one aspect, when the second wearing detection entry condition is met, in this embodiment of this application, data like the sensor data and the third audio signal generated in two different scenes is detected. Double detection is performed on the two types of data, so that accuracy of wearing detection can be improved to a greater extent, and a false detection rate is reduced. According to another aspect, when the second wearing detection entry condition is not met, it indicates that the wireless headset 100 may be touched accidentally, shaken, or the like. In this case, the subsequent wearing detection step may not be performed, and the speaker is not turned on to output an audio signal, thereby reducing power consumption.

It should be noted that, all the wearing detection methods in the foregoing embodiments of this application are performed when the wearable device is in a power-on state or a non-standby state. In other words, when components such as the microphone 130 and the speaker 140 are in a working state, the implementation solutions of this application may be performed. When the wearable device is in a power-off state or a standby state (also referred to as a sleep state) and the microphone 130 and the speaker 140 do not work, another operation (for example, raising to wake up the wearable device, taking the headset out of a box, powering on the wearable device) is first required to wake up or enable the wearable device, so that modules such as the microphone 130 and the speaker 140 work, to further perform the wearing detection solution in this embodiment of this application.

Persons of ordinary skill in the art may understand that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

Implementations of this application may be randomly combined, to achieve different technical effects.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on the computer, the procedure or functions according to embodiments of the present invention are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, a solid-state drive (Solid-State Disk, SSD)), or the like.

Persons of ordinary skill in the art may understand that all or some of the processes of the methods in embodiments may be implemented by a computer program instructing relevant hardware. The program may be stored in a computer-readable storage medium. When the program is run, the processes of the methods in embodiments are performed. The storage medium may include: a magnetic disk, an optical disc, a read-only memory (Read-Only Memory, ROM), or a random access memory (Random Access Memory, RAM).

What is disclosed above are merely example embodiments of the present invention, and certainly are not intended to limit the protection scope of the present invention. Therefore, equivalent variations made in accordance with the claims of the present invention shall fall within the scope of the present invention.

What is claimed is:

1. A wearing detection method applicable to a wearable device having a microphone and a speaker, the method comprising:

obtaining a first audio signal captured by the microphone when the wearable device is not playing audio through the speaker;

determining that a signal feature of the first audio signal meets a wearing detection entry condition, comprises:

extracting a temporal envelope of the first audio signal;

determining a second cross-correlation coefficient between the temporal envelope of the first audio signal and a first temporal envelope, and when the second cross-correlation coefficient reaches a second correlation threshold, determining that the signal feature of the first audio signal meets the wearing detection entry condition; and when it is determined that the signal feature of the first audio signal meets the wearing detection entry condition, the processor is further configured to performs the steps:

outputting a second audio signal to the speaker and obtaining a third audio signal captured by the microphone; and obtaining a signal feature of the third audio signal and determining a wearing status of the wearable device based on the signal feature of the third audio signal.

2. The method according to claim 1, further comprising:

determining that a signal feature of the first audio signal meets a wearing detection entry condition.

3. The method according to claim 2, wherein the determining that a signal feature of the first audio signal meets a wearing detection entry condition comprises:

obtaining a spectrum feature of the first audio signal in a first frequency range;

determining a first cross-correlation coefficient between the spectrum feature of the first audio signal in the first frequency range and a first spectrum feature; and determine that the signal feature of the first audio signal meets the wearing detection entry condition when the first cross-correlation coefficient reaches a first correlation threshold.

4. The method according to claim 3, wherein the first frequency range comprises 20 Hz to 300 Hz or any subrange within 20 Hz to 300 Hz.

5. A wearable device, comprising:

a processor;

a microphone connected to the processor;

a speaker connected to the processor; and a memory connected to the processor, wherein:

the microphone is configured to receive a sound signal and convert the sound signal into an audio signal;

the speaker is configured to receive the audio signal and to convert the audio signal into a sound signal for by the speaker;

the memory is configured to store computer-readable instructions; and the processor is configured to read the computer-readable instructions and to perform the following:

determine that a signal feature of the first audio signal meets a wearing detection entry condition, comprises:

extracting a temporal envelope of the first audio signal;

determining a second cross-correlation coefficient between the temporal envelope of the first audio signal and a first temporal envelope, and when the second cross-correlation coefficient reaches a second correlation threshold, determining that the signal feature of the first audio signal meets the wearing detection entry condition; and when it is determined that the signal feature of the first audio signal meets the wearing detection entry condition, the processor is further configured to performs the steps:

obtain a first audio signal captured by the microphone, output a second audio signal using the speaker and obtain a third audio signal captured by the microphone when the wearable device does not play audio;

obtain a signal feature of the third audio signal; and determine a wearing status of the wearable device based on the signal feature of the third audio signal.

6. The wearable device according to claim 5, wherein the processor, upon reading the computer-readable instructions, is further configured to:

determine that a signal feature of the first audio signal meets a wearing detection entry condition.

7. The wearable device according to claim 6, wherein the processor, upon reading the computer-readable instructions, is further configured to:

obtain a spectrum feature of the first audio signal in a first frequency range;

determine a first cross-correlation coefficient between the spectrum feature of the first audio signal in the first frequency range and a first spectrum feature; and when the first cross-correlation coefficient reaches a first correlation threshold, determine that the signal feature of the first audio signal meets the wearing detection entry condition.

8. The wearable device according to claim 7, wherein the first frequency range comprises 20 Hz to 300 Hz or any sub-range within 20 Hz to 300 Hz.

9. The wearable device according to claim 5, wherein the processor, upon reading the computer-readable instructions, is further configured to:

determine that a signal amplitude of the first audio signal reaches a first signal amplitude threshold.

10. The wearable device according to claim 9, wherein the processor, upon reading the computer-readable instructions, is configured to determine that:

a value of the first audio signal has attained a first amplitude threshold;

an average amplitude of the first audio signal has attained a second amplitude threshold; or a maximum amplitude of the first audio signal has attained a third amplitude threshold.

11. The wearable device according to claim 5, wherein the processor, upon reading the computer-readable instructions, is configured to:

perform frequency domain transformation on the third audio signal to obtain a frequency domain feature of the third audio signal in a second frequency range; and determine the wearing status of the wearable device based on the frequency domain feature of the third audio signal in the second frequency range and a first frequency domain feature.

12. The wearable device according to claim 11, wherein the first frequency domain feature comprises a third signal amplitude threshold, and the processor, upon reading the computer-readable instructions, is configured to:

determine the wearing status of the wearable device based on a maximum amplitude of a frequency response of the third audio signal in the second frequency range and the third signal amplitude threshold.

13. The wearable device according to claim 11, wherein the first frequency domain feature comprises a first frequency response, and the processor, upon reading the computer-readable instructions, is configured to:

determine a third cross-correlation coefficient between the frequency response of the third audio signal in the second frequency range and the first frequency response; and determine the wearing status of the wearable device based on the third cross-correlation coefficient and a third correlation threshold.

14. The wearable device according to claim 13, wherein:

the second audio signal is an infrasound signal whose frequency range is less than 20 Hz and the second frequency range comprises 0 Hz to 20 Hz or any sub-range within 0 Hz to 20 Hz; or the second audio signal is an audible domain signal whose frequency range is 20 Hz to 20000 Hz, and the second frequency range comprises 20 Hz to 300 Hz or any sub-range within 20 Hz to 300 Hz.

15. The wearable device according to claim 5, wherein the processor, upon reading the computer-readable instructions, is configured to:

obtain a fifth audio signal captured by the microphone when the device has determined that the wearable device is playing audio;

determine a transfer function between the microphone and the speaker based on a fourth audio signal that is being played and the fifth audio signal; and obtain a signal feature of the transfer function and determine the wearing status of the wearable device based on the signal feature of the transfer function.

16. The wearable device according to claim 14, wherein the processor, upon reading the computer-readable instructions, is configured to:

perform frequency domain transformation on the transfer function to obtain a frequency domain feature of the transfer function in a third frequency range; and determine the wearing status of the wearable device based on the frequency domain feature of the transfer function in the third frequency range and a second frequency domain feature.

17. A wearable device, comprising:

a processor;

a microphone connected to the processor;

a speaker connected to the processor; and a memory connected to the processor, wherein:

the microphone is configured to receive a sound signal and to convert the sound signal into an audio signal;

the speaker is configured to receive the audio signal and to convert the audio signal into the sound signal for outputting;

the memory is configured to store computer-readable instructions; and the processor is configured to determine that a signal feature of the first audio signal meets a wearing detection entry condition, comprises:

extracting a temporal envelope of the first audio signal;

determining a second cross-correlation coefficient between the temporal envelope of the first audio signal and a first temporal envelope; and when the second cross-correlation coefficient reaches a second correlation threshold, determining that the signal feature of the first audio signal meets the wearing detection entry condition;

when it is determined that the signal feature of the first audio signal meets the wearing detection entry condition, the processor is further configured to read the computer-readable instructions and to perform the following:

obtains a first audio signal captured by the microphone, output a second audio signal using the speaker and obtain a third audio signal captured by the microphone when the wearable device does not play audio;

determine a transfer function between the microphone and the speaker based on the second audio signal and the third audio signal; and obtain a signal feature of the transfer function and determine a wearing status of the wearable device based on the signal feature of the transfer function.

18. The wearable device according to claim 5, wherein the microphone comprises a feedback microphone.

* * * * *